(12) United States Patent
Kong et al.

(10) Patent No.: US 10,979,979 B1
(45) Date of Patent: Apr. 13, 2021

(54) SYNCHRONIZATION SIGNAL BLOCK (SSB) MEASUREMENTS BASED ON A MEASUREMENT CYCLE FREQUENCY

(71) Applicant: QUALCOMM Incorporated, San Diego, CA (US)

(72) Inventors: Ting Kong, San Diego, CA (US); Yongle Wu, San Diego, CA (US); Jafar Mohseni, San Diego, CA (US); Paolo Minero, La Jolla, CA (US); Raghu Narayan Challa, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/692,554

(22) Filed: Nov. 22, 2019

(51) Int. Cl.
*H04W 52/02* (2009.01)
*H04W 24/10* (2009.01)

(52) U.S. Cl.
CPC ....... *H04W 52/0261* (2013.01); *H04W 24/10* (2013.01)

(58) Field of Classification Search
CPC .......................... H04W 52/0261; H04W 24/10
See application file for complete search history.

(56) References Cited

U.S. PATENT DOCUMENTS

| | | | |
|---|---|---|---|
| 2019/0069256 A1 | 2/2019 | Jung et al. | |
| 2019/0159148 A1* | 5/2019 | Jung | H04W 56/0005 |
| 2019/0253906 A1* | 8/2019 | Lin | H04L 5/0048 |
| 2019/0280784 A1* | 9/2019 | Kwak | H04B 17/24 |
| 2019/0306915 A1* | 10/2019 | Jin | H04W 76/28 |
| 2019/0349797 A1* | 11/2019 | Lin | H04W 48/16 |
| 2019/0363809 A1* | 11/2019 | Yoon | H04W 56/00 |
| 2020/0162939 A1* | 5/2020 | Kim | H04W 16/28 |
| 2020/0169340 A1* | 5/2020 | Hwang | H04B 17/327 |
| 2020/0252822 A1* | 8/2020 | Kim | H04W 48/16 |
| 2020/0314673 A1* | 10/2020 | Deogun | H04B 7/0632 |

(Continued)

FOREIGN PATENT DOCUMENTS

| | | |
|---|---|---|
| WO | WO-2018230984 A1 | 12/2018 |
| WO | WO-2019194731 A1 | 10/2019 |

OTHER PUBLICATIONS

"3rd Generation Partnership Project, Technical Specification Group Radio Access Network, NR, Study on UE Power Saving (Release 16)", 3GPP Standard, Technical Report, 3GPP TR 38.840, 3RD Generation Partnership Project (3GPP), Mobile Competence Centre, 650, Route Des Lucioles, F-06921 Sophia-Antipolis Cedex, France, No. V2.0.0, May 29, 2019 (May 29, 2019), XP051753900, pp. 1-73, [retrieved on May 29, 2019] pp. 39-56.

(Continued)

*Primary Examiner* — David Bilodeau
(74) *Attorney, Agent, or Firm* — Qualcomm IP Dept.; James Hunt Yancey, Jr.

(57) ABSTRACT

Wireless communications systems and methods related to SSB measurements are provided. A wireless communication device determines a first measurement for a first synchronization signal block (SSB) and further determines a measurement cycle frequency for performing a SSB measurement based on the first measurement. The wireless communication device performs the SSB measurement based on the measurement cycle frequency.

26 Claims, 10 Drawing Sheets

(56) References Cited

U.S. PATENT DOCUMENTS

2020/0359247 A1* 11/2020 Yi .......................... H04L 5/005

OTHER PUBLICATIONS

International Search Report and Written Opinion—PCT/US2020/057389—ISA/EPO—Feb. 24, 2021.
Qualcomm Incorporated: "UE Power Consumption Reduction in RRM Measurements", 3GPP Draft, 3GPP TSG-RAN WG1 Meeting #96, R1-1903017 UE Power Consumption Reduction in RRM Measurements, 3RD Generation Partnership Project (3GPP), Mobile Competence Centre, 650, Route Des Lucioles, F-06921 Sophia-Antipolis Cede, vol. RAN WG1, No. Athens, Greece, 20190225-20190301, Feb. 16, 2019 (Feb. 16, 2019), XP051600714, 20 Pages, Retrieved from the Internet: URL:http://www.3gpp.org/ftp/tsg%5Fran/WG1%5FRL1/TSGR1%5F96/Docs/R1%2D1903017%2Ezip [retrieved on Feb. 16, 2019], pp. 1-17.
Vivo: "Summary#3 of UE Power Consumption Reduction in RRM Measurements", 3GPP Draft, 3GPP TSG RAN WG1 Meeting #96, R1—1903559_7.2.9.3_ SUMMARY_RAN1_96_RRM_UE_POWER2_THUSDAY9, 3RD Generation Partnership Project (3GPP), Mobile Competence Centre, 650, Route Des Lucioles, F-06921 Sophia-Antipolis Cedex, vol. RAN WG1, No. Athens, Greece, 20190225-20190301 Mar. 3 2019 (Mar. 3 2019), XP051690848, 83 Pages, Retrieved from the Internet: URL: http://www.3gpp.org/ftp/tsg%5Fran/wG1%5FRL1/TSGR1%5F96/Docs/R1%2D1903559%2Ezip [retrieved on Mar. 3 2019] pp. 2-5 pp. 16-19, pp. 48-52.

* cited by examiner

SYNCHRONIZATION SIGNAL BLOCK (SSB) MEASUREMENTS BASED ON A MEASUREMENT CYCLE FREQUENCY

TECHNICAL FIELD

The technology discussed in this disclosure relates generally to wireless communication systems, and more particularly to synchronization signal block (SSB) measurements obtained during communications (e.g., based on a measurement cycle frequency). Embodiments may enable and provide solutions and techniques for efficient power usage (e.g., reducing power consumption) and beneficial mobility performance.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In a radio access network such as a NR network, a BS may transmit synchronization signals to allow UEs to search and acquire synchronization to a cell within the radio access network. The UE may perform signal measurements and cell search. During the search phase, the UE may blindly search for new cells during a measurement window. During the measurement phase, the UE may be unable to identify new cells, but may measure reference signal received power (RSRP), reference signal received quality (RSRQ), and/or signal-to-interference-plus-noise ratio (SINR) for all detected cells.

Additionally or alternatively, due to power demands on wireless communication devices associated with voice, video, packet data, messaging, broadcast, and other communications, there is a desire to limit usage of device components and save power when possible. Discontinuous reception (DRX) is a technique in which a UE may be in DRX idle mode or DRX active time during a DRX cycle. A DRX inactive time allows a UE to power down certain radio components or at least switch certain radio components to a lower power state than when in an active state.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Aspects of the present disclosure provide techniques for determining different measurement cycle frequencies based on different channel conditions. A user equipment (UE) may perform signal measurements and cell search. Additionally or alternatively, the UE may perform tracking loops before performing a paging occasion in a measurement cycle. The UE may determine different measurement cycle frequencies for intra-frequency search, measurement, and/or tracking loops based on channel conditions.

For example, in an aspect of the disclosure, a method of wireless communication includes receiving, by a user equipment (UE), a first synchronization signal block (SSB); determining, by the UE, a first measurement for the first SSB; determining, by the UE, a measurement cycle frequency for performing a SSB measurement based on the first measurement; and performing, by the UE, the SSB measurement based on the measurement cycle frequency.

In an additional aspect of the disclosure, an apparatus includes a transmitter configured to receive, by a UE, a first SSB; and a processor configured to determine, by the UE, a first measurement for the first SSB; determine, by the UE, a measurement cycle frequency for performing a SSB measurement based on the first measurement; and perform, by the UE, the SSB measurement based on the measurement cycle frequency.

In an additional aspect of the disclosure, a computer-readable medium includes program code recorded thereon, the program code including code for causing a wireless communication device to receive a first SSB; code for causing the wireless communication device to determine a first measurement for the first SSB; code for causing the wireless communication device to determine a measurement cycle frequency for performing a SSB measurement based on the first measurement; and code for causing the wireless communication device to perform the SSB measurement based on the measurement cycle frequency.

In an additional aspect of the disclosure, an apparatus includes means for receiving a first SSB; means for determining a first measurement for the first SSB; means for determining a measurement cycle frequency for performing a SSB measurement based on the first measurement; and means for performing the SSB measurement based on the measurement cycle frequency.

In an additional aspect of the disclosure, a method of wireless communication includes determining, by a UE, a first measurement for a first SSB; determining, by the UE, a measurement cycle frequency for performing a SSB measurement based on the first measurement; and performing, by the UE, the SSB measurement based on the measurement cycle frequency.

In an additional aspect of the disclosure, an apparatus includes a processor configured to determine, by a UE, a first measurement for a first SSB; determine, by the UE, a measurement cycle frequency for performing a SSB measurement based on the first measurement; and perform, by the UE, the SSB measurement based on the measurement cycle frequency.

In an additional aspect of the disclosure, a computer-readable medium includes program code recorded thereon, the program code including code for causing a wireless communication device to determine a first measurement for a first SSB; code for causing the wireless communication device to determine a measurement cycle frequency for performing a SSB measurement based on the first measurement; and code for causing the wireless communication device to perform the SSB measurement based on the measurement cycle frequency.

In an additional aspect of the disclosure, an apparatus includes means for determining a first measurement for a first SSB; means for determining a measurement cycle frequency for performing a SSB measurement based on the first measurement; and means for performing the SSB measurement based on the measurement cycle frequency.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
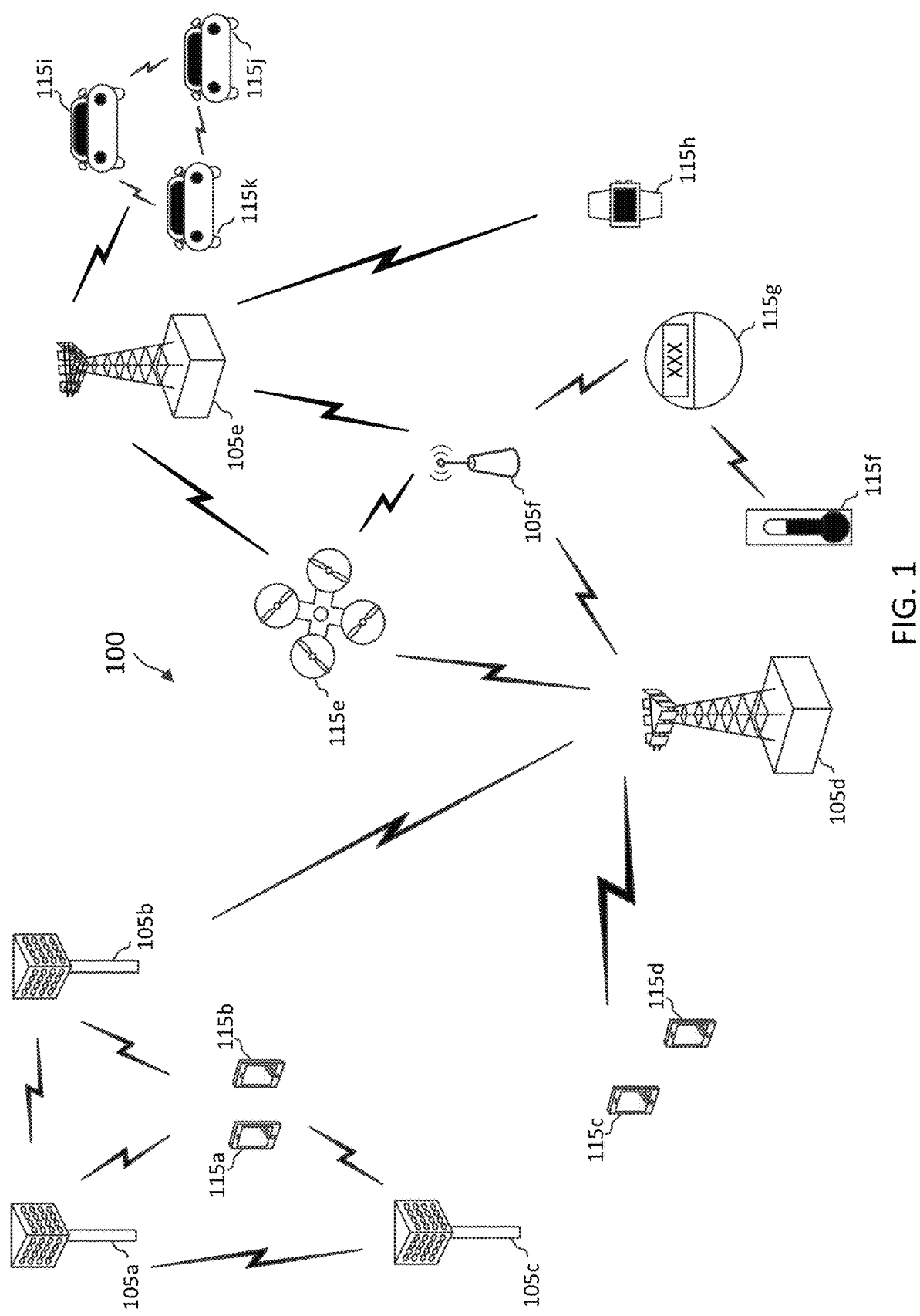
FIG. 1 illustrates a wireless communications network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

A wireless channel between the network (e.g., a BS) and a UE may vary over time. The BS may configure a set of beams for the UE, which at any point of time may use one or two serving beams to receive DL transmissions from or transmit UL transmissions to the BS. The BS and the UE may keep track of the serving beam(s) as well as candidate beams. In a radio access network such as a NR network, a BS may transmit synchronization signals to allow UEs to search and acquire synchronization to a cell within the radio access network. For example, the BS may transmit one or more SSBs during a measurement window. The UE may perform signal measurements and cell search. During the search phase, the UE may blindly search for new cells during the measurement window. During the measurement phase, the UE may be unable to identify new cells, but may measure reference signal received power (RSRP), reference signal received quality (RSRQ), and/or signal-to-interference-plus-noise ratio (SINR) for all detected cells. Additionally or alternatively, the UE may perform tracking loops on a SSB before a paging occasion to provide timing and/or frequency updates for decoding a page.

The present disclosure provides techniques for determining different measurement cycle frequencies. Determinations can be based on a variety of factors (sometimes one and sometimes multiple factors). In some scenarios, these measurement-cycle-frequency determinations may be based on different, dynamic, and/or varying channel conditions. For example, a UE may define one or more down-sampling factors related to the frequency of measuring a given SSB. The sampling factors may be the same and/or different in number and scope. Adjusting measurement cycle frequencies can enable a UE to save power and/or efficiently use limited power resources. That is, for example, not measuring at the same frequency may enable power savings where measurements occur less frequently. Down-sampling in the present application generally refers to down-sampling the frequency of performing an action (e.g., performing SSB measurements and/or tracking loops).

According to some aspects, UEs may determine a measurement cycle frequency based on a condition of a channel in which a SSB is communicated (received and/or transmitted). Channel conditions may be represented in various manners, such as modes (e.g., first, second, third, and so on). Modes may also relate to functional descriptions and/or states of a channel (e.g., poor, normal, good, excellent, etc.). Channel mode descriptions can be related to varying mode numbers and UE operations may be a function of channel condition state. In some aspects, for example, the UE may determine a first mode (e.g., panic mode), a second mode (e.g., normal mode), and a third mode (e.g., excellent mode) based on a first receive signal measurement range, a second receive signal measurement range, and a third receive signal measurement range, respectively.

In some examples, if a UE determines that the channel condition is in a panic mode, then the channel condition is poor (e.g., due to high mobility of the UE, interference, based on low RSRP, RSRQ, and/or SINR, or other factors). The UE may perform infra-frequency search and enable one or more measurements and/or tracking loops before a paging occasion in one or more measurement cycles (e.g., DRX cycle) in response to a determination that the channel condition is in the panic mode.

If the UE determines that the channel condition is in a normal mode, then the channel condition is normal (e.g., by satisfying 3GPP, RSRP, RSRQ, and/SINR requirements). The UE may enable one or more measurements and/or tracking loops before a paging occasion in each measurement cycle and/or invoke a SSB-level sleep in some measurement cycles to save power in response to a determination that the channel condition is in the normal mode. If the UE invokes the SSB-level sleep, the UE enters a sleep mode during a duration of at least one SSB of a SSBS. For example, the UE may be in idle mode and does not wake up to measure at least one SSB.

If the UE determines that the channel condition is in an excellent mode, then the channel condition is excellent (e.g., due to low mobility of the UE, based on high RSRP, RSRQ, and/or SINR, or other factors). The UE may enable tracking loops before a paging occasion in every X measurement cycles to save power, where X is a number greater than one, in response to a determination that the channel condition is in the excellent mode. Additionally or alternatively, the UE may invoke the SSB-level sleep and/or a SSBS-level sleep to save power in response to a determination that the channel condition is in the excellent mode. If the UE invokes the SSBS-level sleep, the UE enters a sleep mode during a duration of a SSBS. For example, the UE may be in idle mode and does not wake up for measurements for the entire SSBS duration.

In some aspects, for example, the UE may determine the first mode, the second mode, and the third mode based on a first receive signal measurement range, a second receive signal measurement range, and a third receive signal measurement range, respectively. For example, the first receive signal measurement range may be less than −6 dB, the second receive signal measurement range may be between −6 dB to 10 dB, and the third receive signal measurement range may be greater than 10 dB. In this example, the UE may determine that a channel is in the first mode if the SNR of the channel is less than −6 dB, may determine that a channel is in the second mode if the SNR of the channel is between 6 dB to 10 dB, and may determine a channel is in the third mode if the SNR of the channel is greater than 10 dB.

The determined channel conditions may vary and change with time. For example, during a first time period, the UE may determine a first measurement for a first SSB and determine that the channel condition, associated with the first SSB, is in the excellent mode. During a subsequent second time period, the UE may determine a second measurement for a second SSB and determine that the channel condition, associated with the second SSB, is in the normal mode. As conditions change (e.g., mobility of the UE, interference levels, etc.), the measurement cycle frequency determinations may be based on different, dynamic, and/or varying channel conditions. Thus, the measurement cycle frequency may also vary over time.

Aspects of the present disclosure can provide several benefits. For example, power efficiency at the UE may be improved by down-sampling the frequency of SSB measurements. For example, the UE may sleep rather than wake up to measure a SSB. Additionally or alternatively, mobility performance at the UE may be improved by configuring the UE with different search, measurement, and tracking loop periodicities for different channel conditions. The techniques provided in the present disclosure may achieve an improved tradeoff between power performance and mobility performance.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot.

In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIB s). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS. In some aspects, SIB1 may contain cell access parameters and scheduling information for other SIBs.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities.

The network 100 may operate over a shared channel, which may include a licensed spectrum, a shared spectrum, and/or an unlicensed spectrum, and may support dynamic medium sharing. The shared channel may be located at frequencies of about 5-6 GHz or above 6 GHz. When a BS 105 operates at a high-frequency range, the BSs 105 may communicate with the UEs 115 using directional beams to overcome the high path-loss in the high-frequency range. Each cell may transmit one or more synchronization signal blocks (SSBs). Each SSB may carry information including a PSS, a SSS, a PBCH signal, a cell ID for the SSB, a current beam index, a measurement window timing, and/or any discovery related reference signals.

A BS 105 may transmit a synchronization signal burst set (SSBS) within a synchronization block measurement timing configuration (SMTC) window. The BS 105 may configure the UE 115 with a SMTC window. The SSBS may include a number of SSBs, each SSB being transmitted over a given beam. Information may be kept substantially similar and consistent through all SSBs in a SSBS. Each SSB may be assigned with a unique number within the SSBS. For example, N SSBs in a SSBS are indexed, for example, from 0 to N-1, where N is a number greater than 1. A BS 105 may transmit a SSBS at certain locations within a measurement window (e.g., SMTC window). A BS 105 may transmit each SSB within a SSBS using a different beam direction. A beam index is assigned to each beam direction.

The UE 115 may monitor for SSBs within the SMTC window. To reduce power consumption, the UE 115 may operate in a discontinuous reception (DRX) mode. In a wireless communication network, DRX is a technique in which the UE 115 may enter an idle mode for a certain period of time and enter an active mode for another period of time. While the UE 115 is in active mode, the UE 115 may monitor for physical DL control channel (PDCCH) from a serving BS and decode PDCCH received from the BS. While the UE 115 is in idle mode, the UE 115 may not monitor for PDCCH, thus allowing the UE 115 to power down certain radio components or at least switch certain radio components to a lower power state than an active state. Accordingly, the use of DRX can provide power savings at the UE 115. At a beginning of each DRX cycle, the UE 115 typically wakes up again and repeats the process.

While in the idle mode, the UE 115 may perform signal measurements and cell search. During the search phase, the UE 115 may blindly search for new cells during the SMTC window. During the measurement phase, the UE 115 may be unable to identify new cells, but may measure RSRP, RSRQ, and/or SINR for all detected cells. For example, the UE 115 may search for SSBs during the SMTC window and measure the SSBs, which may include transmissions from a serving SSB and/or one or more non-serving SSBs. While the UE 115 is in idle mode, the SSB with the highest quality RSRP may be referred to as the serving SSB. Other SSBs may be referred to as non-serving SSBs or neighbor SSBs. Additionally or alternatively, a cell that transmitted the serving SSB may be referred to as the serving cell. Other cells may be referred to as non-serving cells or neighbor cells. For each SSB, the UE may measure RSRP, RSRQ, and/or SINR on a set of received or detected SSBs.

A UE 115 may select the cell that provides the UE 115 with a SSB having the best signal strength or quality (e.g., highest RSRP, highest RSRQ, or highest SINR) as the serving cell. After selecting the serving cell, the UE may monitor the serving cell and/or neighbor cells. If the UE 115 detects that a neighbor cell has a better signal strength or quality compared to the serving cell (e.g., higher RSRP than the RSRP associated with the serving cell, higher RSRQ than the RSRQ associated with the serving cell, and/or higher SINR than the SINR associated with the serving cell), the UE 115 may trigger a cell reselection procedure and select the neighbor cell as the serving cell. The UE 115 may be more likely to trigger the cell reselection procedure while the UE is mobile. If the UE 115 is in the idle mode, it may be desirable to reduce at least some of the SSB measurements to reduce power consumption at the UE 115.

Additionally or alternatively, the UE 115 may be configured with paging occasions (e.g., at certain time periods) for idle mode operations. While the UE 115 is in the idle mode, the UE 115 may wake up to monitor for paging from the network during a paging occasion. The UE 115 may enable or perform tracking loops on a SSB (e.g., a serving SSB) before a paging occasion to provide timing and/or frequency updates for decoding a page. Tracking loops may include, for example, frequency tracking loops (FTL), time tracking loops (TTL), and power tracking loops (e.g., automatic gain control (AGC), etc.). Regarding FTL, the UE 115 may track the frequency error at the UE 115 or a frequency difference between the UE 115 and the BS 105 based on the frequency of reference signals (RS) that are transmitted by the BS 105. The frequency error or difference is used as a feedback for a frequency correction. Regarding TTL, the UE 115 may track the change in transmission time between the UE 115 and the BS 105. The time delay (or delay spread) is used to determine the optimal window of data samples to process with a Fast Fourier Transform (FFT) to extract the OFDM signaling. In general, the UE 115 may perform the FTL and TTL to synchronize the frequency and time references of the UE 115 to the frequency and time at the BS 105, respectively. The receiver AGC algorithm may be designed to maintain a constant signal power at the input to the demodulator. In some instances, the AGC can be implemented through the mechanism of two loops: an outer loop, and an inner loop. The outer loop controls the low-noise amplifier (LNA) gain state in RF (i.e., by increasing or decreasing amplifier gain); the LNA gain state can compensate for coarse gain variations. In contrast, the inner loop estimates and adjusts the digital variable gain control (DVGA) to maintain a constant set-point for the signal power at the input to the demodulator.

The search, measurement, and tracking loops may be based on a SSB. It may be desirable to schedule infra-frequency search, measurement, and/or tracking loops to increase power efficiency. For example, the UE 115 may be configured to measure SSBs and/or enable tracking loops based on channel conditions to provide timing and/or frequency updates for decoding a page. The present disclosure provides techniques for defining different modes with different periodicities for intra-frequency search, measurement, and/or tracking loops based on channel conditions. Such techniques may provide for different power optimization strategies to improve power efficiency. An intra-frequency search may refer to the UE search for a target cell that operates in the same operating carrier frequency as a current serving cell. The UE may perform an intra-frequency action (e.g., a search, a measurement, or a tracking loop) on potential target cells that operate in the same carrier frequency as the current serving cell.

The UE 115 may receive a SSB from a cell and may determine a measurement for the SSB. SSB measurement determinations can generally relate to power, signal quality, or signal strength (e.g., RSRPs and/or RSRQs) associated with a received SSB. The signal measurements of the SSB may represent the channel condition in which the SSB is received. The UE 115 may determine, based on a condition of the channel in which the SSB is transmitted, a measurement cycle frequency for performing a SSB measurement. The measurement cycle frequency may specify a frequency with which a task (e.g., SSB measurement) should be performed per X measurement cycles, where X is a positive number. In some aspects, the UE 115 may determine that the channel is in a first mode or a panic mode if the condition of the channel is poor (e.g., based on low RSRP, RSRQ, and/or SINR). The channel condition may be poor due to high mobility of the UE 115, interference, or other factors. If the UE 115 determines that the channel is in the first mode or the panic mode, then the UE 115 may perform infra-frequency search and enable one or more measurements and/or tracking loops before a paging occasion in each DRX cycle (e.g., in an idle mode of the DRX cycle). Reference to a channel being in a particular mode may also refer to the UE 115 being in the particular mode.

In some aspects, the UE 115 may determine that the channel is in a second mode or a normal mode if the condition of the channel is normal. The channel condition may be normal if it satisfies a specification requirement (e.g., 3GPP, RSRP, RSRQ, and/SINR requirements). If the UE 115 determines that the channel is in the second mode or the normal mode, then the UE 115 may enable one or more measurements and/or tracking loops before a paging occasion in each DRX cycle and/or invoke a SSB-level sleep in some measurement cycles to save power. During a SSB-level sleep, the UE 115 sleeps during at least one SSB per SSBS. If the UE 115 invokes the SSB-level sleep, the UE 115 enters a sleep mode during a duration of at least one SSB of a SSBS. If the UE 115 sleeps during a given SSB, then the UE 115 may be in idle mode and does not wake up to measure the given SSB.

In some aspects, the UE 115 may determine that the channel is in a third mode or an excellent mode if the condition of the channel is excellent (e.g., based on high RSRP, RSRQ, and/or SINR). The channel condition may be excellent due to low mobility of the UE 115, low interference, or other factors. If the UE 115 determines that the channel is in the third mode or the excellent mode, then the UE 115 may down-sample the frequency of one or more signal measurements and/or the number of tracking loops per DRX cycle. For example, the UE 115 may enable tracking loops before a paging occasion in every X DRX cycles to save power, where X is a number greater than one. Additionally or alternatively, if the UE 115 determines that the channel is in the third mode or the excellent mode, then the UE 115 may enable the SSB-level sleep and/or a SSBS-level sleep to save power. During a SSBS-level sleep, the UE 115 sleeps during the entire SSBS. If the UE 115 invokes the SSBS-level sleep, the UE 115 enters a sleep mode during a duration of a SSBS. If the UE 115 sleeps during a given SSBS, then the UE 115 does not wake up during a measurement cycle to measure any SSBs. In contrast to the first mode/panic mode or the second mode/normal in which the UE 115 may enable tracking loops or measure SSB in every DRX cycle, the third mode/excellent mode allows the UE 115 to perform one tracking loop every X DRX cycles to save power, where X is a positive number.

Mode determinations may happen in a variety of manners and/or based on one or more factors. In some aspects, for example, the UE 115 may determine the first mode, the second mode, and the third mode based on a first receive signal measurement range, a second receive signal measurement range, and a third receive signal measurement range, respectively. For example, the first receive signal measurement range may be less than −6 dB, the second receive signal measurement range may be between −6 dB to 10 dB, and the third receive signal measurement range may be greater than 10 dB. In this example, the UE may determine that a channel is in the first mode if the SNR of the channel is less than −6 dB, may determine that a channel is in the second mode if the SNR of the channel is between 6 dB to 10 dB, and may determine a channel is in the third mode if the SNR of the channel is greater than 10 dB.

Figure 2:
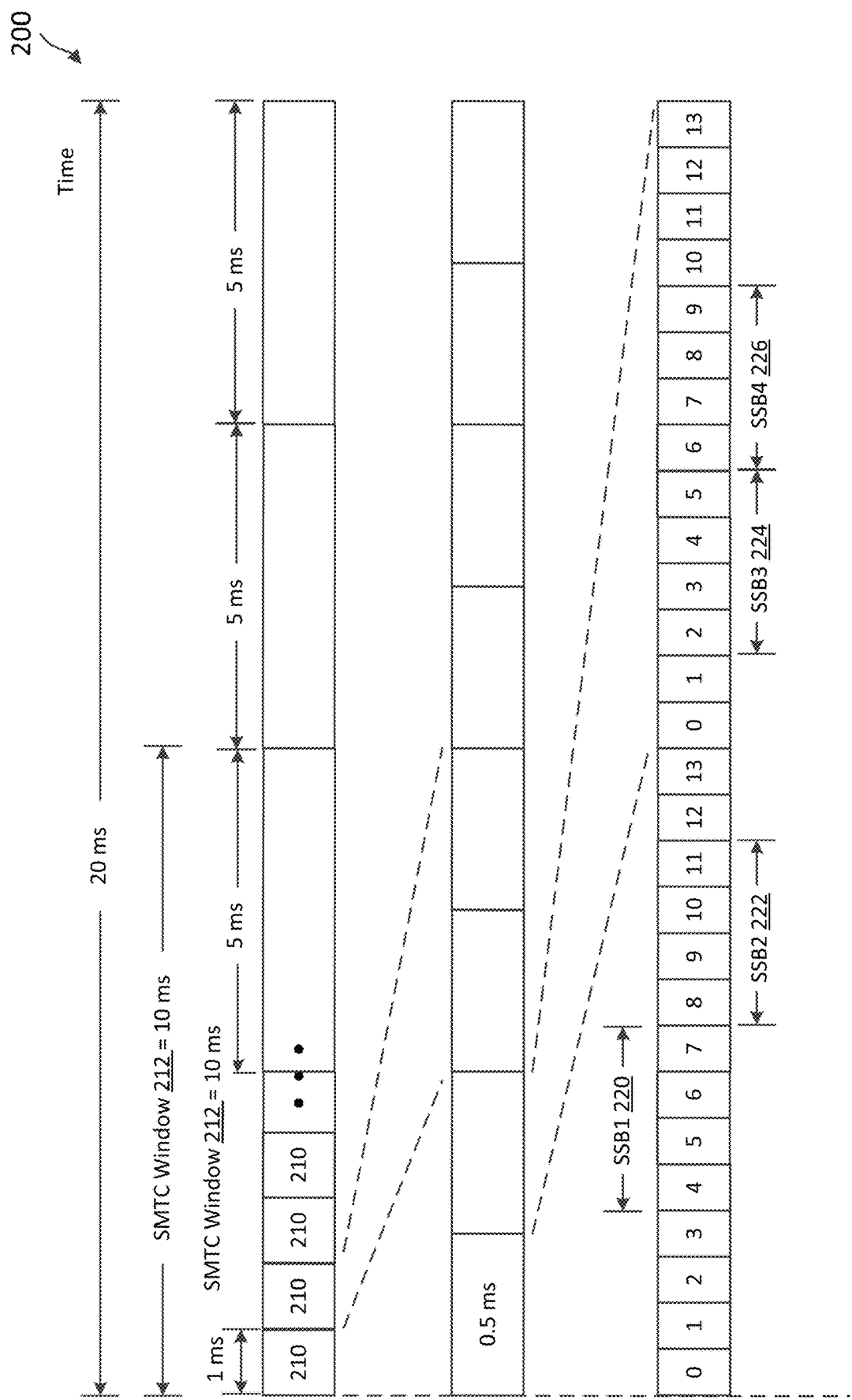
FIG. 2 illustrates a scheduling/transmission configuration method for synchronization signal block (SSB) transmission according to some aspects of the present disclosure.

FIG. 2 illustrates a scheduling/transmission configuration method 200 for SSB transmission according to some aspects of the present disclosure. The scheduling/transmission configuration method 200 may be employed by BSs such as the BSs 105 and UEs such as the UEs 115 in a network such as the network 100 for communications. In particular, the BS may communicate with the UE using time-frequency resources configured as shown in the scheduling/transmission configuration method 200. In FIG. 2, the x-axis represents time in some arbitrary units.

In the scheduling/transmission configuration 200, the number of transmission slots 210 within an SMTC window 212 may vary depending on the subcarrier spacing (SCS) and the number of symbols within a transmission slot 210. When the SCS is about 15 kilohertz (kHz), each transmission slot 210 may span about 1 ms and the SMTC window 212 may include about five transmission slots 210. When the SCS is about 30 kHz, each transmission slot 210 may span about 0.5 ms and the SMTC window 212 may include about ten transmission slots 210. When the SCS is about 120 kHz, each transmission slot 210 may span about 0.125 ms and the SMTC window 212 may include about forty transmission slots 210. When the SCS is about 240 kHz, each transmission slot 210 may span about 62.5 microseconds (µs) and the SMTC window 212 may include about eighty transmission slots 210.

The BS 105 may transmit a SSB in each of the transmission slots 210. In the example illustrated in FIG. 2, the SCS may be about 30 kHz, a SSB may include a group of four OFDM symbols transmitted in the same beam direction, and the BS 105 may transmit up to eight SSBs per SSBS during the SMTC window 212. For example, the BS may transmit a first set of SSBs including a SSB1 220, a SSB2 222, a SSB3 224, and a SSB4 226 over 1 ms. The BS may transmit the SSB4, SSB5, SSB6, and SSB7 having the same beam pattern as the SSB1 220, the SSB2 222, the SSB3 224, and the SSB4 226, respectively, over the next 1 ms (not shown). The SSB1 220 may point in a first beam direction, the SSB2 222 may point in a second beam direction, the SSB3 224 may point in a third beam direction, and the SSB4 226 may point in a fourth beam direction. The following example may describe a UE 115 that receives and measures four SSBs. It should be understood that the UE 115 may receive and measure fewer than or more than four SSBs during the SMTC window 212. In some aspects, a cell may transmit a plurality of SSBs to the UE 115, and the UE 115 may detect a subset of the transmitted SSBs.

In the example illustrated in FIG. 2, the UE 115 may receive the SSB1 220, the SSB2 222, the SSB3 224, and the SSB4 226 during the SMTC window 212 and measure and categorize the SSBs based on signal strength. Depending on the location of the UE 115, the UE 115 may detect some SSBs, but not others. For example, if the UE 115 is in close proximity to a cell, the UE 115 may detect a strong signal strength from at least one SSB transmitted from the cell. Additionally or alternatively, the UE 115 may detect some leakage or reflections from other SSBs as well. The UE 115 may determine a measurement for each of the received SSB1 220, the SSB2 222, the SSB3 224, and the SSB4 226. For a given SSB (e.g., SSB1), the UE 115 may determine a measurement cycle frequency for performing a measurement for the next given SSB (e.g., SSB1) in the next SSBS. The measurement cycle frequency may specify a frequency with which a task (e.g., SSB measurement) should be performed per X measurement cycles, where X is a positive number.

In some aspects, the UE 115 may determine, based on a signal strength of a SSB, that a channel in which the UE 115 receives a SSB is in the third mode or the excellent mode. In response to a determination that the channel is in the third mode or the excellent mode, the UE 115 may invoke a SSB-level sleep and accordingly sleep during at least one SSB within or per a SSBS (e.g., eight SSBs). For example, if the UE 115 sleeps during the SSB1 and the SSB2, it may be unnecessary for the UE 115 to wake up and monitor the SSB1 and the SSB2 within a SSBs. The UE 115 may desire to monitor weaker SSBs (SSBs having a weak signal) less often than stronger SSBs per measurement cycle, potentially providing reduced power consumption. If the UE 115 determines that the quality of a SSB (e.g., a serving SSB transmitted from the serving cell), the UE 115 may determine to reduce the rate of the overall scheduling and decrease the measurement cycle frequency for performing measurements of the SSB.

Figure 3:
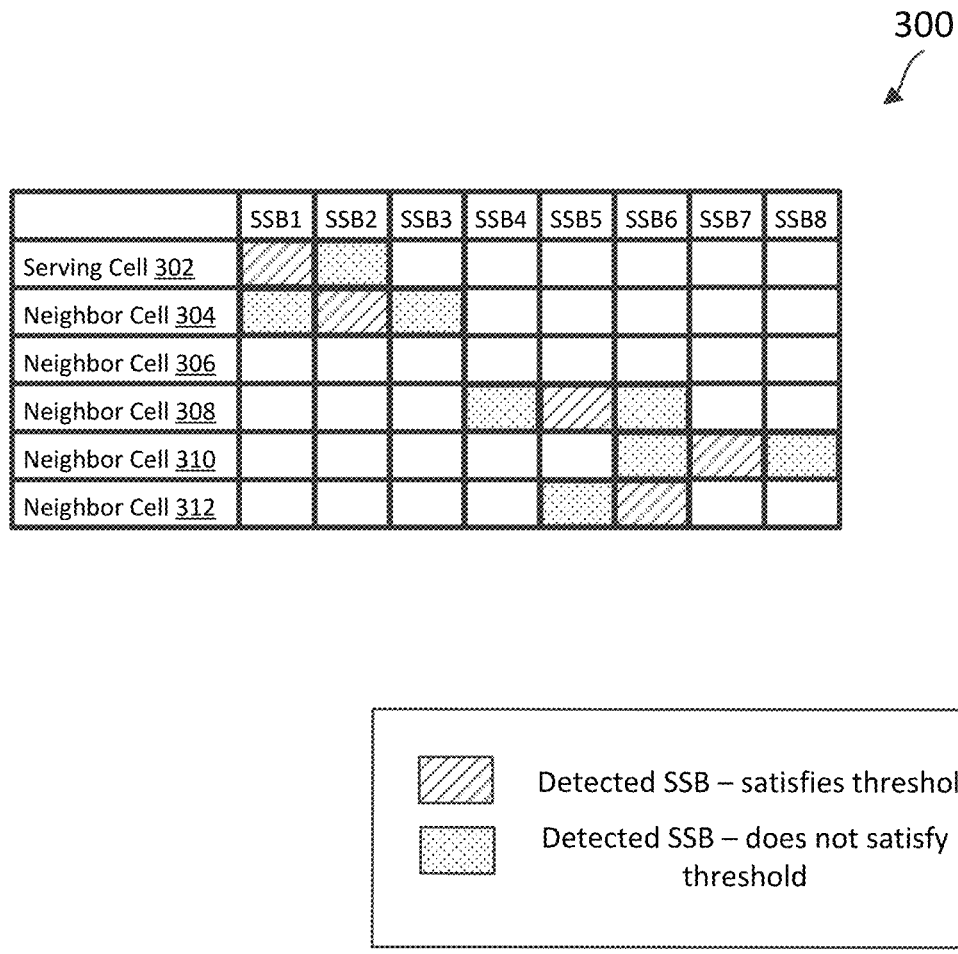
FIG. 3 illustrates a table storing SSB information based on signal strength according to some aspects of the present disclosure.

FIG. 3 illustrates a table 300 storing SSB information based on signal strength according to some aspects of the present disclosure. The UEs such as the UEs 115 may generate and/or maintain the table 300 in a network such as the network 100 for communications.

The UE 115 may categorize SSBs based on their signal strength (e.g., RSRP, RSRQ, or SINR). The UE 115 may determine the signal strength of the detected or received SSBs in relation to a threshold. The signal strength may be based on, for example, RSRP, RSRQ, SINR, etc. A signal strength may satisfy the threshold if the signal strength is equal to or greater than the threshold. Conversely, the signal strength may not satisfy the threshold if the signal strength is less than the threshold. The UE 115 may maintain the table 300 characterizing the serving cell and neighbor cells that transmit SSBs that satisfy or do not satisfy the threshold.

As shown in the first row of the table 300, a serving cell 302 of the UE 115 may transmit a SSB1 and a SSB2 to the UE 115, and the UE 115 may receive and measure each of the SSB1 and the SSB2 transmitted by the serving cell 302. The SSB1 transmitted by the serving cell 302 satisfies the threshold, but the SSB2 transmitted by the serving cell 302 does not satisfy the threshold. In some aspects, the serving cell 302 may have transmitted SSB3, SSB4, SSB5, SSB6, SSB7, and/or SSB8, but the UE 115 was unable to detect these SSBs if they were transmitted by the serving cell 302. As shown in the second row of the table 300, a neighbor cell 304 may transmit a SSB1, a SSB2, and a SSB3 to the UE 115, and the UE 115 may receive and measure each of the SSB1, the SSB2, and the SSB3 transmitted by the neighbor cell 304. The SSB2 transmitted by the neighbor cell 304 satisfies the threshold, but neither the SSB1 nor the SSB3 transmitted by the neighbor cell 304 satisfies the threshold. In some aspects, the neighbor cell 304 may have transmitted SSB4, SSB5, SSB6, SSB7, and/or SSB8, but the UE 115 was unable to detect these SSBs if they were transmitted by the neighbor cell 304. In some aspects, a neighbor cell 306 may have transmitted SSB1, SSB2, SSB3, SSB4, SSB5, SSB6, SSB7, and/or SSB8, but the UE 115 was unable to detect these SSBs if they were transmitted by the neighbor cell 306.

As shown in the fourth row of the table 300, a neighbor cell 308 of the UE 115 may transmit a SSB4, a SSBS, and a SSB6 to the UE 115, and the UE 115 may receive and measure each of the SSB4, the SSBS, and the SSB6 transmitted by the neighbor cell 308. The SSBS transmitted by the neighbor cell 308 satisfies the threshold, but neither the SSB4 nor the SSB6 transmitted by the neighbor cell 308 satisfies the threshold. In some aspects, the neighbor cell 308 may have transmitted SSB1, SSB2, SSB3, SSB7, and/or SSB8, but the UE 115 was unable to detect these SSBs if they were transmitted by the neighbor cell 308.

As shown in the fifth row of the table 300, a neighbor cell 310 may transmit a SSB6, a SSB7, and a SSB8 to the UE 115, and the UE 115 may receive and measure each of the SSB6, the SSB7, and the SSB8 transmitted by the neighbor cell 310. The SSB7 transmitted by the neighbor cell 310 satisfies the threshold, but neither the SSB6 nor the SSB8 transmitted by the neighbor cell 310 satisfies the threshold. In some aspects, the neighbor cell 310 may have transmitted SSB1, SSB2, SSB3, SSB4, and/or SSBS, but the UE 115 was unable to detect these SSBs if they were transmitted by the neighbor cell 310.

As shown in the sixth row of the table 300, a neighbor cell 312 may transmit a SSBS and a SSB6 to the UE 115, and the UE 115 may detect and measure each of the SSBS and the SSB6 transmitted by the neighbor cell 312. The SSB6 transmitted by the neighbor cell 312 satisfies the threshold, but the SSB7 transmitted by the neighbor cell 312 does not satisfy the threshold. In some aspects, the neighbor cell 312 may have transmitted SSB1, SSB2, SSB3, SSB4, SSB7 and/or SSB8, but the UE 115 was unable to detect these SSBs if they were transmitted by the neighbor cell 312.

The UE 115 may determine different down-sampling cycles for SSBs that satisfy the threshold and SSBs that do not satisfy the threshold. For example, the UE 115 may define different down-sampling factors for each SSB so that the UE 115 may sleep in different SSBs during different measurement cycles. For example, if the UE 115 is not scheduled to wake up, the UE may continue to remain in the sleep mode and does not wake up to perform signal measurements. If the UE 115 determines a down-sampling factor of one, then the UE 115 may wake up in all measurement cycles. In this example, the UE 115 may determine that the measurement cycle frequency is one for every measurement cycle for performing the SSB measurement. The UE 115 may accordingly perform a SSB measurement once per measurement cycle.

If the UE 115 determines a down-sampling factor of two, then the UE 115 may wake up in one measurement cycle for every two measurement cycles. In this example, the UE 115 may determine that the measurement cycle frequency is one per two measurement cycles for performing a SSB measurement. The UE 115 may accordingly perform a SSB measurement once per two measurement cycles. If the UE 115 determines a down-sampling factor of X, then the UE 115 may wake up in one measurement cycle for every X measurement cycles, where X is an integer greater than one. In this example, the UE 115 may determine that the measurement cycle frequency is one per X measurement cycles for performing a SSB measurement. The UE 115 may accordingly perform a SSB measurement once per X cycles.

Figure 4:
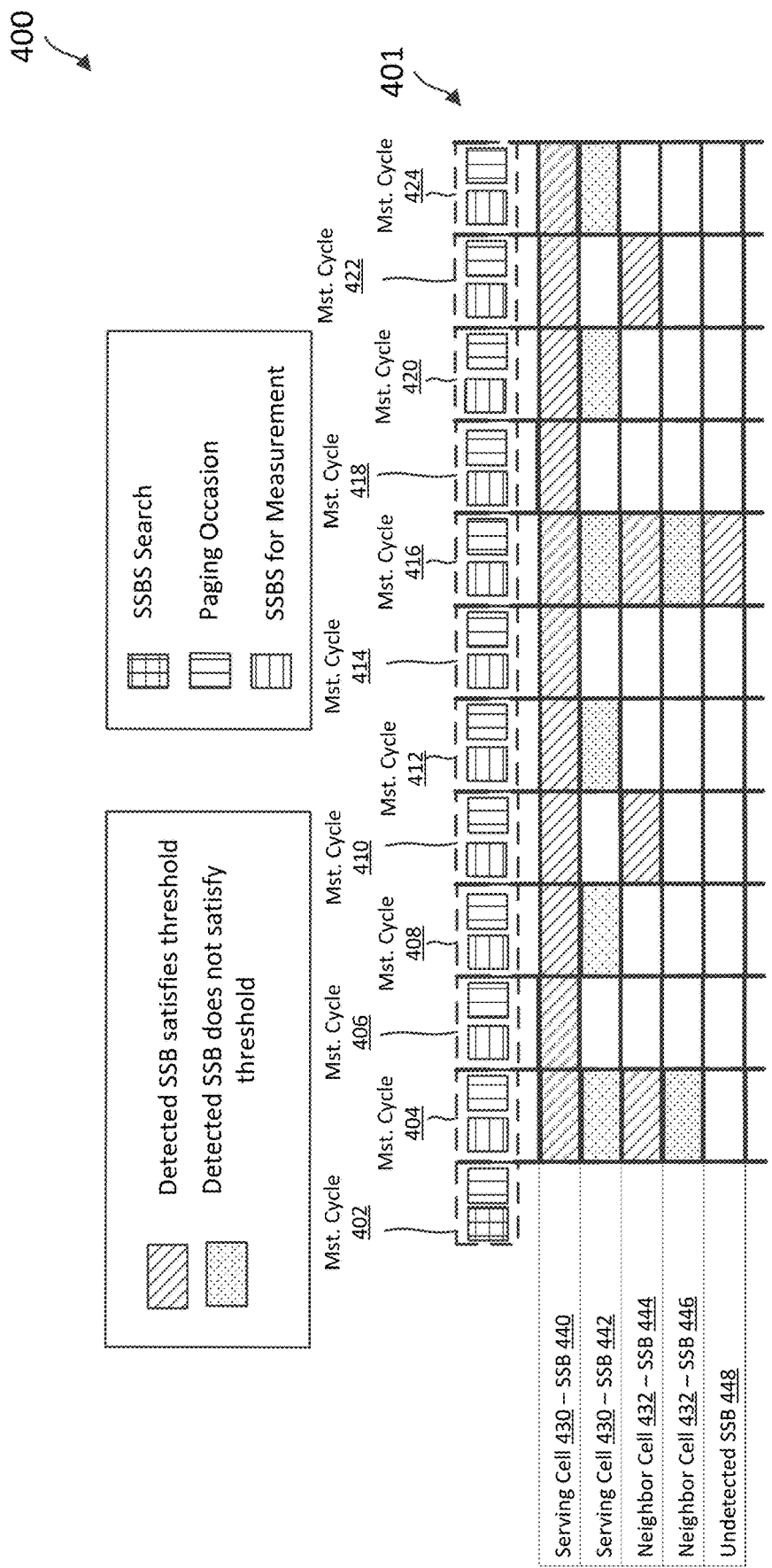
FIG. 4 illustrates a down-sampling factor configuration method according to some aspects of the present disclosure.
Figure 5:
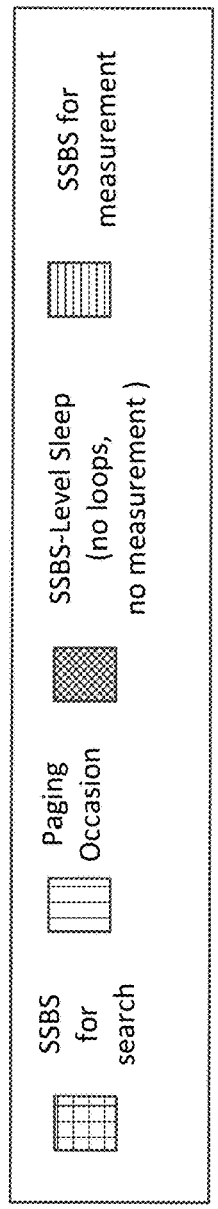
FIG. 5 illustrates a down-sampling factor configuration method according to some aspects of the present disclosure.
Figure 5:
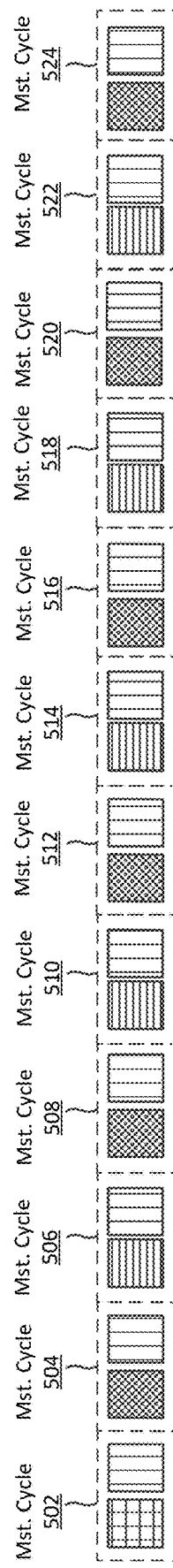

FIGS. 4 and 5 illustrate a down-sampling factor configurations according to some aspects of the present disclosure. The UE 115 may determine, based on the down-sampling factor, a SSB sleep pattern in a measurement cycle. A SSB sleep pattern may be, for example, a SSB-level sleep or SSBS-level sleep pattern. FIG. 4 illustrates an example down-sampling factor configuration for which the UE 115 may invoke the SSB-level sleep. During a SSB-level sleep, the UE 115 sleeps during at least one SSB per SSBS. If the UE 115 sleeps during a given SSB, then the UE 115 may be in idle mode and does not wake up to measure the given SSB. FIG. 5 illustrates an example down-sampling factor configuration for which the UE 115 may invoke the SSBS-level sleep. During a SSBS-level sleep, the UE 115 sleeps during the entire SSBS. If the UE 115 sleeps during a given SSBS, then the UE 115 does not wake up during a measurement cycle to measure any SSBs.

FIG. 4 illustrates a down-sampling factor configuration method 400 according to some aspects of the present disclosure. The down-sampling factor configuration method 400 may be employed by UEs such as the UEs 115 in a network such as the network 100 for communications. In particular, the network 100 may transmit SSBs during multiple measurement cycles (e.g., DRX cycles) to the UE as shown in the down-sampling factor configuration method 400. In the down-sampling factor configuration method 400, each measurement cycle 402, 404, 406, 408, 410, 412, 414, 416, 418, 420, 422, and 424 (e.g., DRX cycle) may have about the same duration (e.g., about 1.28 seconds), and the UE 115 may determine a down-sampling factor configuration for the respective measurement cycle. The UE 115 may perform a SSB search, a SSB measurement, a tracking loop, and/or sleep during a measurement cycle.

The UE 115 may determine to perform searches based on particular measurement cycles. In FIG. 4, a serving cell 430 and a neighbor cell 432 may transmit SSBs within a SSBS during one or more measurement cycles. The UE 115 may perform a SSBS search every twelve measurement cycles and may perform a SSB measurement during one or more measurement cycles. The UE 115 may perform a SSBS search to identify new cells and SSBS transmitted by the new cells. The UE 115 may perform a SSBS search and a paging occasion during the measurement cycle 402. For example, the UE 115 performs the SSBS search during the measurement cycle 402 and may perform another search during a thirteenth measurement cycle after the measurement cycle 424 (not shown). Although the UE 115 is described as performing a SSBS search every twelve measurement cycles, it should be understood that the UE 115 may determine to and may perform a SSBS search every R number of measurement cycles, where R may be a number greater than or less than twelve.

The UE 115 may maintain a table 401 storing SSB information according to some aspects of the present disclosure. As shown in a first row of the table 401, the serving cell 430 of the UE 115 may transmit a SSBS including a SSB 440 for a measurement cycle 404. The UE 115 may receive and measure the SSB 440 transmitted by the serving cell 430 during the measurement cycle 404. The SSB 440 transmitted by the serving cell 430 may have a strong signal strength and may accordingly satisfy the threshold. The UE 115 may determine, based on a determination that the SSB 440 satisfies the threshold, a down-sampling factor of one for measuring the SSB 440. Accordingly, the UE 115 may perform a measurement of the SSB 440 within a SSBS and a paging occasion during each of the measurement cycles 404, 406, 408, 410, 412, 414, 416, 418, 420, 422, and 424.

As shown in a second row of the table 401, the serving cell 430 of the UE 115 may transmit a SSBS including a SSB 442 for a measurement cycle 404. The UE 115 may receive and measure the SSB 442 transmitted by the serving cell 430 during the measurement cycle 404. The SSB 442 transmitted by the serving cell 430 may have a weak signal strength and may accordingly not satisfy the threshold. The UE 115 may determine, based on a determination that the SSB 442 does not satisfy the threshold, a down-sampling factor of two for measuring the SSB 440. Accordingly, the UE 115 may perform a measurement of the SSB 442 within a SSBS and a paging occasion every two measurement cycles (e.g., during each of the measurement cycles 404, 408, 412, 416, 420, and 424).

As shown in a third row of the table 401, a neighbor cell 432 of the UE 115 may transmit a SSBS including a SSB 444 for a measurement cycle 404. The UE 115 may receive and measure the SSB 444 transmitted by the neighbor cell 432 during the measurement cycle 404. The SSB 444 transmitted by the neighbor cell 432 may have a strong signal strength and may accordingly satisfy the threshold. The UE 115 may determine, based on a determination that the SSB 444 satisfies the threshold, a down-sampling factor of three for measuring the SSB 444. Accordingly, the UE 115 may perform a measurement of the SSB 444 within a SSBS and a paging occasion every three measurement cycles (e.g., during each of the measurement cycles 404, 410, 416, and 422).

As shown in a fourth row of the table 401, the neighbor cell 432 of the UE 115 may transmit a SSBS including a SSB 446 for a measurement cycle 404. The UE 115 may receive and measure the SSB 446 transmitted by the neighbor cell 432 during the measurement cycle 404. The SSB 446 transmitted by the neighbor cell 432 may have a weak signal strength and may accordingly not satisfy the threshold. The UE 115 may determine, based on a determination that the SSB 446 does not satisfy the threshold, a down-sampling factor of six for measuring the SSB 446. Accordingly, the UE 115 may perform a measurement of the SSB 446 within a SSBS and a paging occasion every six measurement cycles (e.g., during each of the measurement cycles 404 and 416).

As shown in a fifth row of the table 401, a neighbor cell of the UE 115 may transmit a SSBS including a SSB 448. The UE 115 may receive and measure the SSB 448 transmitted by the neighbor cell during the measurement cycle 416, but not during the other measurement cycles 404, 406, 408, 410, 412, 414, 418, 420, 422, or 424. The SSB 448 transmitted by the neighbor cell may have a strong signal strength and may accordingly satisfy the threshold. The UE 115 may determine, based on a determination that the SSB 448 satisfies the threshold, a down-sampling factor of six for measuring the SSB 448. Accordingly, the UE 115 may perform a measurement of the SSB 448 within a SSBS and a paging occasion every six measurement cycles starting from the measurement cycle 416. Additionally or alternatively, during the measurement cycle 416, the UE 115 may scan all SSBs 440, 442, 444, 446, and 448 rather than performing a more expensive search for the SSBs.

FIG. 5 illustrates a down-sampling factor configuration method 500 according to some aspects of the present disclosure. The down-sampling factor configuration method 500 may be employed by UEs such as the UEs 115 in a network such as the network 100 for communications. In particular, the network 100 may transmit SSBs during multiple measurement cycles (e.g., DRX cycles) to the UE as shown in the down-sampling factor configuration method 500. In the down-sampling factor configuration method 500, each measurement cycle 502, 504, 506, 508, 510, 512, 514, 516, 518, 520, 522, and 524 (e.g., DRX cycle) may be 1.28 seconds, and the UE 115 may determine a down-sampling factor configuration for the respective measurement cycle. The UE 115 may perform a SSB search, a SSB measurement, a tracking loop, and/or sleep during a measurement cycle.

The UE 115 may perform a SSBS search every twelve measurement cycles and may perform a SSB measurement during one or more measurement cycles. The UE 115 may perform a SSBS search to identify new cells and SSBS transmitted by the new cells. The UE 115 may perform a SSBS search and a paging occasion during the measurement cycle 502. For example, the UE 115 performs the SSBS search during the measurement cycle 502 and may perform another search during a thirteenth measurement cycle after the measurement cycle 524 (not shown).

In FIG. 5, the UE 115 may determine that the channel is in the third mode or the excellent mode. Accordingly, the UE 115 may down-sample the frequency of one or more signal measurements and/or number of tracking loops per measurement cycle (e.g., DRX cycle). In response to a determination that the channel is in the third mode, UE 115 may down-sample the frequency of performing a SSB measurement by a factor of two. Accordingly, the UE 115 may perform SSBS-level sleep and a paging occasion once every two measurement cycles (e.g., measurement cycles 504, 508, 512, 516, 520, and 524). While the UE 115 is in the SSBS-level sleep, the UE 115 sleeps during the entire SSBS and does not perform tracking loops or SSB measurements. For example, the UE 115 may sleep in all eight SSBs per SSBS for a 30 kHz SCS. By sleeping during the SSBS in the measurement cycles 504, 508, 512, 516, 520, and 524, the UE 115 may reduce power consumption. Additionally or alternatively, the UE 115 may perform SSBS measurement and a paging occasion once every two measurement cycles (e.g., measurement cycles 506, 510, 514, 518, and 522).

Figure 6:
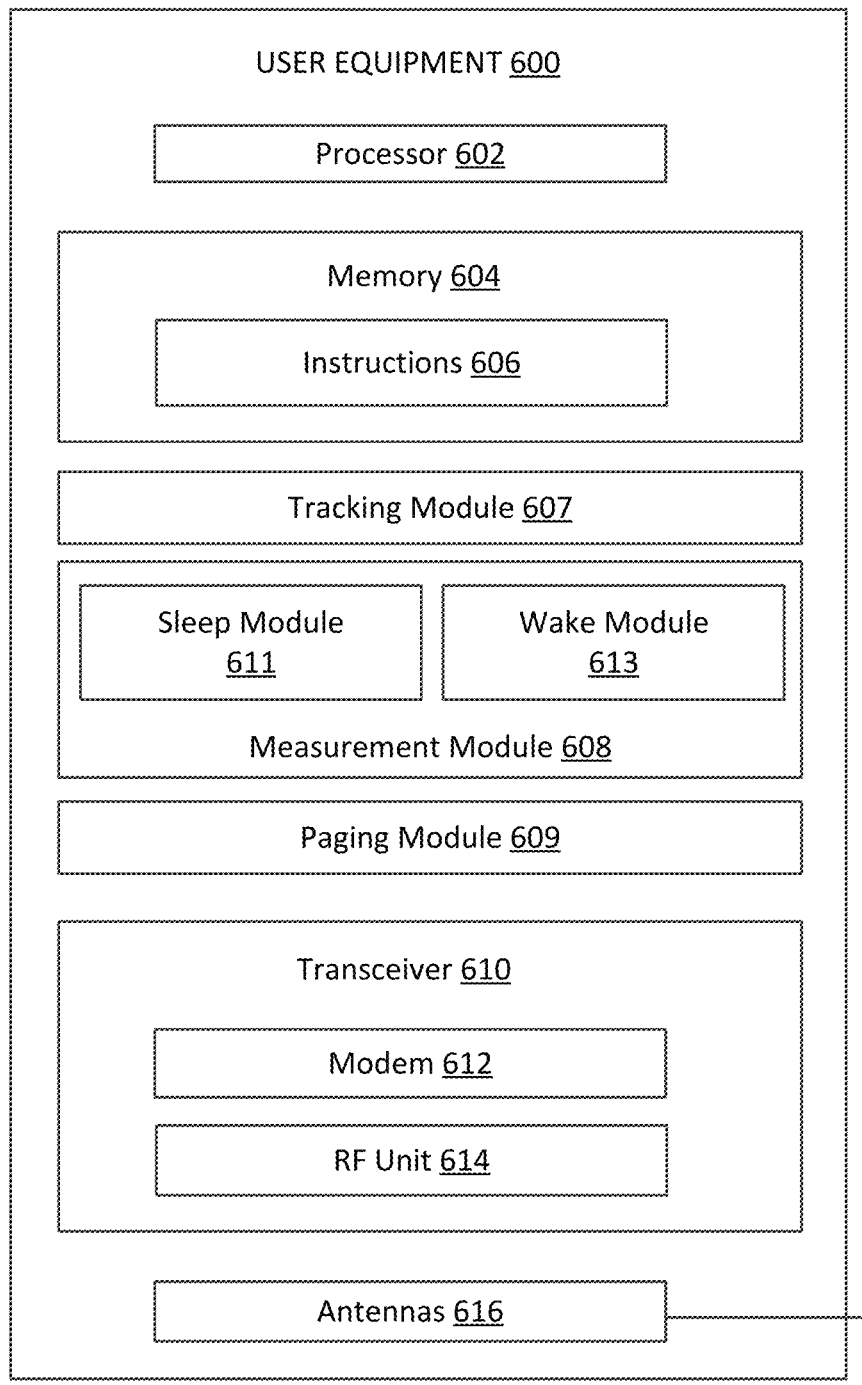
FIG. 6 is a block diagram of a user equipment (UE) according to some aspects of the present disclosure.

FIG. 6 is a block diagram of a UE 600 according to some aspects of the present disclosure. The UE 600 may be a UE 115 discussed above in FIG. 1. As shown, the UE 600 may include a processor 602, a memory 604, a tracking module 607, a measurement module 608, a paging module 609, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 1-6 and 8-12. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The tracking module 607, the measurement module 608, and/or the paging module 609 may be implemented via hardware, software, or combinations thereof. The tracking module 607, the measurement module 608, and/or the paging module 609 may be implemented as a processor, circuit, and/or instructions 606 stored in the memory 604 and executed by the processor 602. In some instances, the tracking module 607, the measurement module 608, and/or the paging module 609 can be integrated within the modem subsystem 612. The tracking module 607, the measurement module 608, and/or the paging module 609 can be implemented by a combination of software components (e.g., executed by a DSP or a general processor) and hardware components (e.g., logic gates and circuitry) within the modem subsystem 612. The tracking module 607, the measurement module 608, and/or the paging module 609 may be used for various aspects of the present disclosure, for example, aspects of FIGS. 1-6 and 8-12.

The UE 600 may determine whether to perform monitor/measure/tracking on its own. In some aspects, the tracking module 607 may be configured to perform the FTL, TTL, and/or the power tracking loops (e.g., AGC).

In some aspects, the measurement module 608 may be configured to receive a first SSB and to determine a first measurement for the first SSB. The measurement module 608 may be configured to determine a measurement cycle frequency for performing a SSB measurement based on the first measurement. The measurement module 608 may be configured to perform the SSB measurement based on the measurement cycle frequency. The measurement module 608 may include a sleep module 611 and a wake module 613. The sleep module 611 may enter the UE 600 into a sleep mode, during which the UE 600 does not wake up to perform signal measurements. The sleep module 611 may invoke a SSB-level sleep during which the UE 600 sleeps during at least one SSB per SSBS and/or may invoke a SSBS-level sleep during which the UE 600 sleeps during an entire duration of a SSBS. The wake module 613 may enter the UE 600 into a wake mode, during which the UE 600 wakes up and may perform actions such as signal measurements.

In some aspects, the paging module 609 may be configured to monitor PDCCH for paging.

As shown, the transceiver 610 may include the modem subsystem 612 and the RF unit 614. The transceiver 610 can be configured to communicate bi-directionally with other devices, such as the BSs 105 or BS 700. The modem subsystem 612 may be configured to modulate and/or encode the data from the memory 604, the tracking module 607, the measurement module 608, and/or the paging module 609 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., a SSB, a measurement for the SSB, and/or a measurement cycle frequency) to the tracking module 607, the measurement module 608, or the paging module 609 for processing. The antennas 616 may include multiple antennas of similar or different designs in order to sustain multiple transmission links. The RF unit 614 may configure the antennas 616.

In some aspects, the transceiver 610 is configured to receive a SSB by coordinating with the measurement module 608. In some aspects, the UE 600 can include multiple transceivers 610 implementing different radio access technologies (RATs) (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
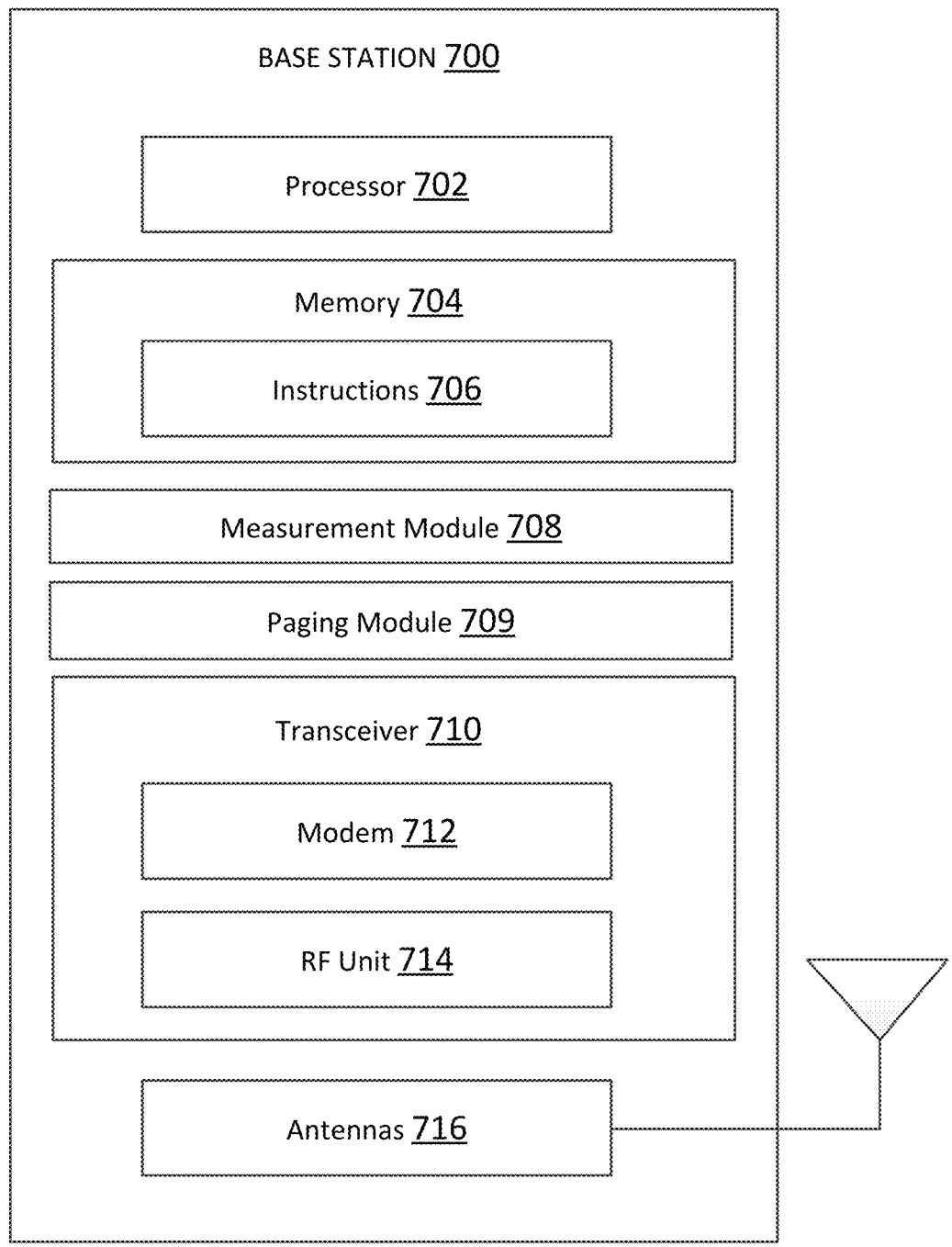
FIG. 7 is a block diagram of a base station (BS) according to some aspects of the present disclosure.

FIG. 7 is a block diagram of a BS 700 according to some aspects of the present disclosure. The BS 700 may be a BS 105 as discussed above in FIG. 1. As shown, the BS 700 may include a processor 702, a memory 704, a measurement module 708, a paging module 709, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 1-5 and 7-12. Instructions 706 may also be referred to as code, which may be interpreted broadly to include any type of computer-readable statement(s) as discussed above with respect to FIG. 6.

The measurement module 708 and/or the paging module 709 may be implemented via hardware, software, or combinations thereof. The measurement module 708 and/or the paging module 709 may be implemented as a processor, circuit, and/or instructions 706 stored in the memory 704 and executed by the processor 702. In some instances, the measurement module 708 and/or the paging module 709 can be integrated within the modem subsystem 712. The measurement module 708 and/or the paging module 709 can be implemented by a combination of software components (e.g., executed by a DSP or a general processor) and hardware components (e.g., logic gates and circuitry) within the modem subsystem 712. The measurement module 708 and/or the paging module 709 may be used for various aspects of the present disclosure, for example, aspects of FIGS. 1-5 and 7-12.

In some aspects, the measurement module 708 may be configured to transmit a SSB to the UE. In some aspects, the paging module 609 may be configured to transmit PDCCH to the UE 600 for paging.

As shown, the transceiver 710 may include the modem subsystem 712 and the RF unit 714. The transceiver 710 can be configured to communicate bi-directionally with other devices, such as the UEs 115 and/or 600 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., grants, resource allocations, a SSB, a measurement for the SSB, and/or a measurement cycle frequency) from the modem subsystem 712 (on outbound transmissions) or of transmissions originating from another source such as a UE 115 and/or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices. The RF unit 714 may correspond to the RF transmit chains included within a transmit chain, as discussed in the present disclosure.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 or 600 according to some aspects of the present disclosure. The antennas 716 may further receive data messages transmitted from other devices and provide the received data messages for processing and/or demodulation at the transceiver 710. The transceiver 710 may provide the demodulated and decoded data to the measurement module 708 for processing. The antennas 716 may include multiple antennas of similar or different designs in order to sustain multiple transmission links.

In an example, the transceiver 710 is configured to transmit a SSB by coordinating with the measurement module 708. In some aspects, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
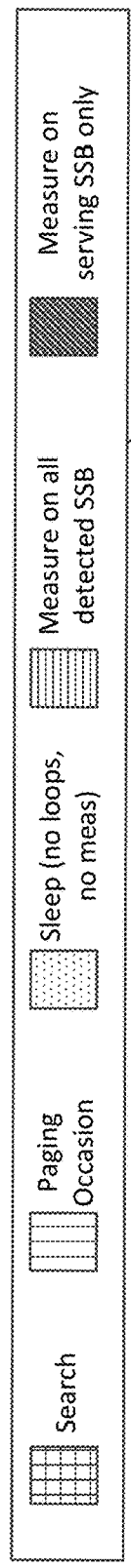
FIG. 8 illustrates a baseline down-sampling factor configuration method according to some aspects of the present disclosure.
Figure 8:
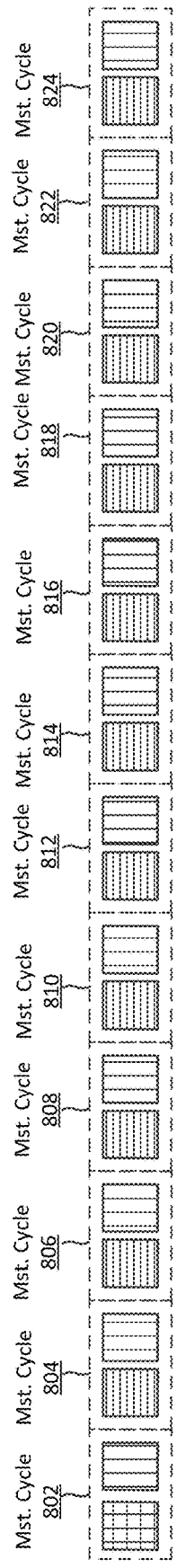

FIGS. 8-11 illustrate different down-sampling factor configurations according to some aspects of the present disclosure. A legend 801 shown in FIG. 8 is applicable to FIGS. 8-11.

FIG. 8 illustrates a baseline down-sampling factor configuration method 800 according to some aspects of the present disclosure. The baseline down-sampling factor configuration method 800 may be employed by UEs such as the UEs 115 in a network such as the network 100 for communications. In particular, the network 100 may transmit SSBs during multiple measurement cycles to the UE as shown in the baseline down-sampling factor configuration method 800. In FIG. 8, the UE 115 performs no down-sampling. The UE 115 may perform a SSBs search every twelve measurement cycles and may perform a SSB measurement during one or more measurement cycles. The UE 115 may perform a search to identify new cells and SSBs transmitted by the new cells. The UE 115 may perform a SSB search and a paging occasion during a measurement cycle 802. For example, the UE 115 performs the SSBs search during the measurement cycle 802 and may perform another search during a thirteenth measurement cycle after the measurement cycle 824 (not shown).

In FIG. 8, the UE 115 may determine that the channel is in the second mode or the normal mode. The UE 115 may determine to not down-sample the frequency of the SSB measurements in response to a determination that the channel is in the second mode. Accordingly, the UE 115 may perform a measurement of all detected SSBs and a paging occasion every measurement cycle (e.g., measurement cycles 802, 804, 806, 808, 810, 812, 814, 816, 818, 820, 822, and 824).

Figure 9:
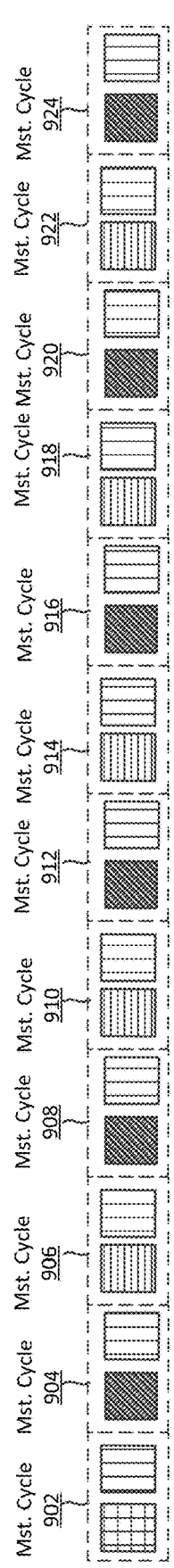
FIG. 9 illustrates a down-sampling factor configuration method according to some aspects of the present disclosure.

FIG. 9 illustrates a down-sampling factor configuration method 900 according to some aspects of the present disclosure. The down-sampling factor configuration method 900 may be employed by UEs such as the UEs 115 in a network such as the network 100 for communications. In particular, the network 100 may transmit SSBs during multiple measurement cycles to the UE as shown in the down-sampling factor configuration method 900. The BS 105 may transmit SSBs irrespective of whether the UE performs a measurement or not. In FIG. 9, the UE 115 may down-sample the frequency of performing measurements of the serving SSB by a factor of two.

The UE 115 may perform a SSBs search every twelve measurement cycles and may perform a SSB measurement during one or more measurement cycles. The UE 115 may perform a search to identify new cells and SSBs transmitted by the new cells. The UE 115 may perform a SSB search and a paging occasion during a measurement cycle 902. For example, the UE 115 performs the SSBs search during the measurement cycle 902 and may perform another search during a thirteenth measurement cycle after the measurement cycle 924 (not shown).

In FIG. 9, the UE 115 may determine that the channel is in the second mode or the normal mode. In response to a determination that the channel is in the second mode, the UE 115 may determine to down-sample the frequency of performing measurements of the non-serving SSBs by a factor of two. The UE 115 may perform a measurement of the serving SSB only and a paging occasion once every two measurement cycles (e.g., measurement cycles 904, 908, 912, 916, 920, and 924). Additionally or alternatively, the UE 115 may perform a measurement of all detected SSBs and a paging occasion every other measurement cycle (e.g., measurement cycles 906, 910, 914, 918, and 922). The UE 115 may save power by waking up to capture a measurement of only the serving SSB during the measurement cycles 904, 908, 912, 916, 920, and 924 compared to waking up to capture measurements for all detected SSBs (e.g., eight SSBs) during the measurement cycles 906, 910, 914, 918, and 922.

The UE 115 may invoke a SSB-level sleep by waking up in the serving SSB in every measurement cycle and waking up in all detected SSBs in every other measurement cycle, which may be equivalent to down-sampling the frequency of performing measurements of the non-serving SSB by a factor of two. In some aspects, the UE 115 may down-sample the frequency of performing measurements of SSBs (that are transmitted from a serving cell and that satisfy the threshold) by one, may down-sample the frequency of performing measurements of SSBs (that are transmitted from a serving cell and that do not satisfy the threshold) by a factor of two, may down-sample the frequency of performing measurements of SSBs (that are transmitted from a neighbor cell and that satisfy the threshold) by a factor of two, and may down-sample the frequency of performing measurements of SSBs (that are transmitted from a neighbor cell and that do not satisfy the threshold) by a factor of two.

Figure 10:
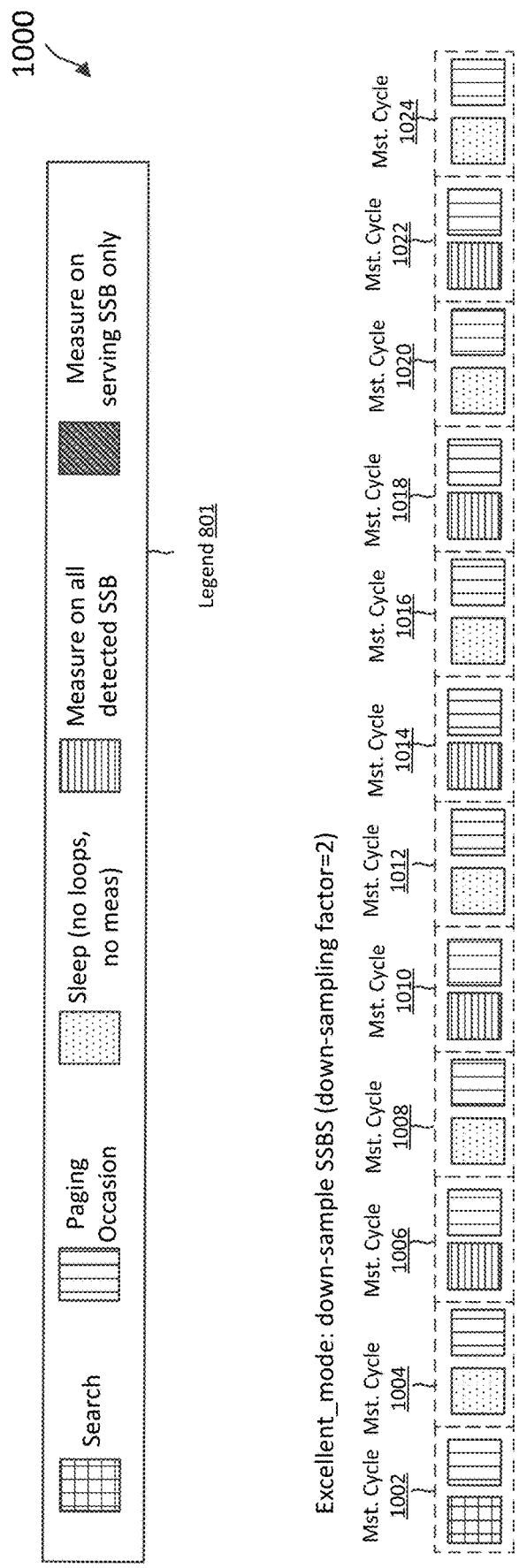
FIG. 10 illustrates a down-sampling factor configuration method according to some aspects of the present disclosure.

FIG. 10 illustrates a down-sampling factor configuration method 1000 according to some aspects of the present disclosure. The down-sampling factor configuration method 1000 may be employed by UEs such as the UEs 115 in a network such as the network 100 for communications. In particular, the network 100 may transmit SSBs during multiple measurement cycles to the UE as shown in the down-sampling factor configuration method 1000. In FIG. 10, the UE 115 may down-sample the frequency of performing measurements of the SSBS by a factor of two.

The UE 115 may perform a SSBs search every twelve measurement cycles and may perform a SSB measurement during one or more measurement cycles. The UE 115 may perform a search to identify new cells and SSBs transmitted by the new cells. The UE 115 may perform a SSB search and a paging occasion during a measurement cycle 1002. For example, the UE 115 performs the SSBs search during the measurement cycle 1002 and may perform another search during a thirteenth measurement cycle after the measurement cycle 1024 (not shown).

In FIG. 10, the UE 115 may determine that the channel is in the third mode or the excellent mode. In response to a determination that the channel is in the third mode, the UE 115 may determine to down-sample the frequency of performing measurements of the SSBS by a factor of two. The UE 115 may invoke a SSBS-level sleep once every two measurement cycles (e.g., measurement cycles 1004, 1008, 1012, 1016, 1020, and 1024). The UE 115 may invoke a SSBS-level sleep by sleeping during the SSBS in the measurement cycles 1004, 1008, 1012, 1016, 1020, and 1024, which may be equivalent to down-sampling the SSBS by a factor of two. Additionally or alternatively, the UE 115 may perform a measurement of all detected SSBs once every two measurement cycles (e.g., measurement cycles 1004, 1008, 1012, 1016, 1020, and 1024). The UE 115 may save power by sleeping during the SSBS in the measurement cycles 1004, 1008, 1012, 1016, 1020, and 1024 compared to waking up to capture measurements for all detected SSBs (e.g., eight SSBs) during the measurement cycles 1006, 1010, 1014, 1018, and 1022. The UE 115 may continue to perform a paging occasion for every measurement cycle (e.g., every DRX cycle).

Figure 11:
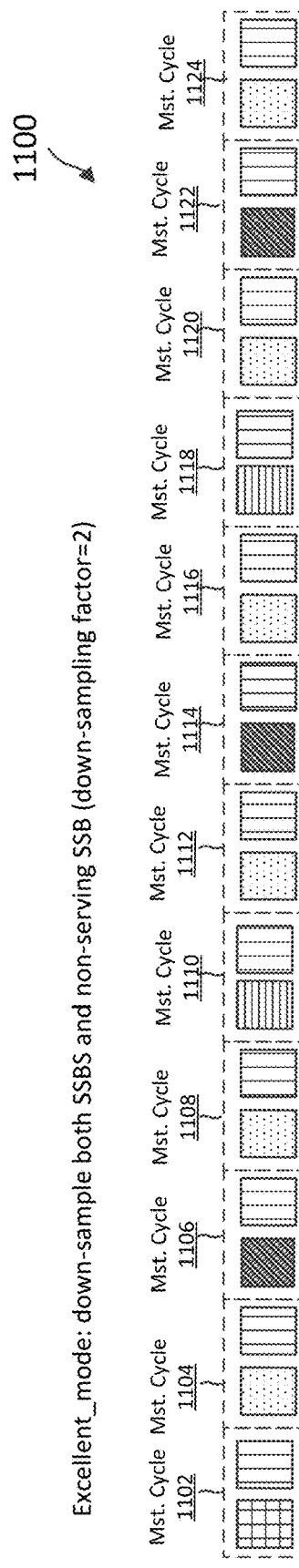
FIG. 11 illustrates a down-sampling factor configuration method according to some aspects of the present disclosure.

FIG. 11 illustrates a down-sampling factor configuration 1100 according to some aspects of the present disclosure. The down-sampling factor configuration 1100 may be employed by UEs 115 in a network such as the network 110 for communications. In particular, the network 110 may transmit SSBs during multiple measurement cycles to the UE as shown in the down-sampling factor configuration 1100. In FIG. 11, the UE 115 may down-sample the frequency of performing measurements of the SSBS by a factor of two and may further down-sample the frequency of performing measurements of the non-serving SSB(s) in the measurement cycles as discussed below.

The UE 115 may perform a SSBs search every twelve measurement cycles and may perform a SSB measurement during one or more measurement cycles. The UE 115 may perform a search to identify new cells and SSBs transmitted by the new cells. The UE 115 may perform a SSB search and a paging occasion during a measurement cycle 1102. For example, the UE 115 performs the SSBs search during the measurement cycle 1102 and may perform another search during a thirteenth measurement cycle after the measurement cycle 1124 (not shown).

In FIG. 11, the UE 115 may determine that the channel is in the third mode or the excellent mode. In response to a determination that the channel is in the third mode, the UE 115 may determine to down-sample the frequency of performing measurements of the SSBS by a factor of two and to down-sample the frequency of performing measurements of the non-serving SSB(s) in the measurement cycles. The UE 115 may invoke a SSBS-level sleep once every two measurement cycles (e.g., measurement cycles 1104, 1108, 1112, 1116, 1120, and 1124). The UE 115 may invoke a SSBS-level sleep by sleeping during the SSBS in the measurement cycles 1104, 1108, 1112, 1116, 1120, and 1124, which may be equivalent to down-sampling the frequency of performing measurements of the SSBS by a factor of two. Additionally or alternatively, the UE 115 may perform a measurement of only the serving SSB once every four measurement cycles (e.g., measurement cycles 1106, 1114, and 1122) and may perform a measurement of all detected SSBs once every four measurement cycles (e.g., measurement cycles 1110 and 1118). The UE 115 may save more power by sleeping during the SSBS in the measurement cycles 1104, 1108, 1112, 1116, 1120, and 1124 compared to waking up to capture a measurement for only a serving SSB during the measurement cycle 1106, 1114, and 1122 and compared to waking up to capture measurements for all detected SSBs (e.g., eight SSBs) during the measurement cycles 1110 and 1118. Additionally or alternatively, the UE 115 may save more power by waking up to capture a measurement for only a serving SSB during the measurement cycle 1106, 1114, and 1122 compared to waking up to capture measurements for all detected SSBs (e.g., eight SSBs) during the measurement cycles 1110 and 1118. The UE 115 may continue to perform a paging occasion for every measurement cycle (e.g., every DRX cycle).

In some aspects, the UE 115 may down-sample the frequency of performing measurements of the non-serving SSBs (that are transmitted from a serving cell and that satisfy the threshold) by a factor of one, may down-sample the frequency of performing measurements of the non-serving SSBs (that are transmitted from a serving cell and that do not satisfy the threshold) by a factor of two, may down-sample the frequency of performing measurements of the non-serving SSBs (that are transmitted from a neighbor cell and that satisfy the threshold) by a factor of two, and may down-sample the frequency of performing measurements of the non-serving SSBs (that are transmitted from a neighbor cell and that do not satisfy the threshold) by a factor of two.

It should be understood that the discussion above related to performing SSB measurements also applies to performing tracking loops. For example, the UE may down-sample the frequency of performing tracking loops as discussed in relation to down-sampling the frequency of performing SSB measurements. In some aspects, if the UE determines that the channel condition is in a first mode or a panic mode, the UE may perform an intra-frequency search and one or more tracking loops before a paging occasion in each measurement cycle in response to a determination that the channel condition is in the first mode. If the UE determines that the channel condition is in a second mode or a normal mode indicating a higher channel quality than the first mode, the UE may perform one or more tracking loops before a paging occasion in each measurement cycle and may invoke a SSB-level sleep during at least some measurement cycles. If the UE determines that the channel condition is in a third mode or an excellent mode indicating a higher channel quality than the second mode, the UE may perform one or more tracking loops before a paging occasion in every X measurement cycles, where X is a number greater than one. Additionally or alternatively, the UE may invoke a SSBS-level sleep during at least some measurement cycles.

Figure 12:
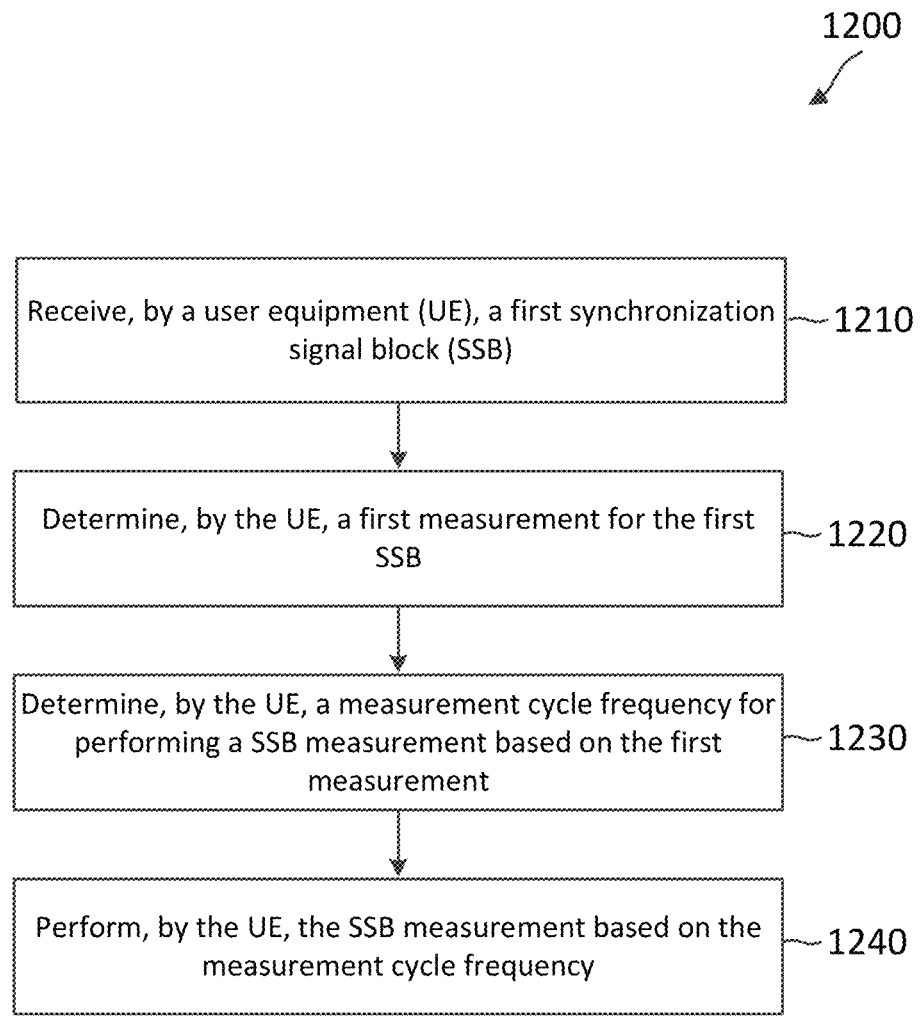
FIG. 12 is a flow diagram of a method of wireless communication according to some aspects of the present disclosure.

FIG. 12 is a flow diagram of a method 1200 of wireless communication according to embodiments of the present disclosure. Blocks of the method 1200 can be executed by a computing device (e.g., a processor, processing circuit, and/or other suitable component) of a wireless communication device, such as the UE 115. As illustrated, the method 1200 includes a number of enumerated blocks, but embodiments of the method 1200 may include additional blocks before, after, and in between the enumerated block. In some embodiments, one or more of the enumerated blocks may be omitted or performed in a different order.

At block 1210, the method 1200 includes receiving, by a UE, a first synchronization signal block (SSB). The first SSB may be, for example, a SSB1, SSB2, SSB3, SSB4, SSB5, SSB6, SSB1, or SSBS. The UE may monitor for one or more SSBs during a synchronization block measurement timing configuration (SMTC) window. The UE may receive the SSB within a SSBS during a SMTC window.

At block 1220, the method 1200 includes determining, by the UE, a first measurement for the first SSB. The first measurement may be, for example, RSRP, RSRQ, and/or SINR.

At block 1230, the method 1200 includes determining, by the UE, a measurement cycle frequency for performing a SSB measurement based on the first measurement. The measurement cycle frequency may be based on, for example, a condition of the channel in which the first SSB is transmitted. The UE may determine the measurement cycle frequency by down-sampling the frequency of performing SSB measurements (e.g., serving SSB measurements, non-serving SSB measurements, etc.).

At block 1240, the method 1200 includes performing, by the UE, the SSB measurement based on the measurement cycle frequency. For example, the UE may wake up to measure the first SSB based on the measurement cycle frequency.

Additionally or alternatively, as discussed, the UE may also perform tracking loops in accordance with a second measurement cycle frequency. The second measurement cycle frequency may be based on the condition of the channel in which the first SSB is transmitted.

In some aspects, a method of wireless communication includes determining, by a UE, a first measurement for a first SSB; determining, by the UE, a measurement cycle frequency for performing a SSB measurement based on the first measurement; and performing, by the UE, the SSB measurement based on the measurement cycle frequency. The method may include monitoring, by the UE, for one or more SSBs during a SMTC window, where receiving the first SSB includes receiving the first SSB during the SMTC window. The method may include determining, based on a condition of a channel in which the first SSB is received, a mode of a plurality of modes; and determining, based on the mode, the measurement cycle frequency. The method may include determining whether a channel condition, associated with the first SSB, is in a first mode or a second mode, where the second mode indicates a higher channel quality than the first mode; and performing, by the UE, at least one of an intra-frequency search or one or more tracking loops before a paging occasion in a measurement cycle in response to a determination that the channel condition is in the first mode. The method may include in response to a determination that the channel condition is in the second mode: performing, by the UE, one or more tracking loops before a paging occasion in one or more measurement cycles; and invoking a SSB-level sleep during at least some measurement cycles. Invoking the SSB-level sleep may include entering, by the UE, a sleep mode during a duration of at least one SSB of a SSBS. The method may include determining, by the UE, whether the SSB measurement satisfies a threshold, where determining the measurement cycle frequency includes down-sampling a frequency of performing the SSB measurement by a factor of a first number in response to a determination that the SSB measurement satisfies the threshold, and where determining the measurement cycle frequency includes down-sampling the frequency of performing the SSB measurement by a factor of a second number in response to a determination that the SSB measurement does not satisfy the threshold, and where the first number is less than the second number.

The method may include determining whether the channel condition is in a third mode, where the third mode indicates a higher channel quality than the second mode; and in response to a determination that the channel condition is in the third mode: performing, by the UE, one or more tracking loops before a paging occasion in every X measurement cycles, where X is a number greater than one; and invoking a SSBS-level sleep during at least some measurement cycles. Invoking the SSBS-level sleep may include entering, by the UE, a sleep mode during a duration of a SSBS. Determining the measurement cycle frequency may include down-sampling a frequency of performing measurements of the SSBS. Determining the measurement cycle frequency may include down-sampling a frequency of performing measurements of the first SSB. The method may include determining whether the first measurement satisfies a threshold; and determining the measurement cycle frequency based on whether the first measurement satisfies the threshold. The method may include determining the first measurement by determining a RSRP measurement of the first SSB, a RSRQ measurement of the first SSB, or a SINR measurement of the first SSB.

In some aspects, an apparatus may include a processor configured to: determine, by a UE, a first measurement for a first SSB; determine, by the UE, a measurement cycle frequency for performing a SSB measurement based on the first measurement; and perform, by the UE, the SSB measurement based on the measurement cycle frequency. The apparatus may further include a transceiver configured to receive the first SSB during a SMTC window, and the processor may be configured to monitor, by the UE, for one or more SSBs during the SMTC window. The processor may be further configured to: determine, based on a condition of a channel in which the first SSB is received, a mode of a plurality of modes; and determine the measurement cycle frequency based on the mode. The processor may be further configured to: determine whether a channel condition, associated with the first SSB, is in a first mode or a second mode, where the second mode indicates a higher channel quality than the first mode; and perform, by the UE, an intra-frequency search and one or more tracking loops before a paging occasion in a measurement cycle in response to a determination that the channel condition is in the first mode. The processor may be further configured to in response to a determination that the channel condition is in the second mode: perform, by the UE, one or more tracking loops before a paging occasion in one or more measurement cycles; and invoke a SSB-level sleep during at least some measurement cycles. To invoke the SSB-level sleep, the processor may be further configured to enter a sleep mode during a duration of at least one SSB of a SSBS. The processor may be further configured to: determine, by the UE, whether the SSB measurement satisfies a threshold; down-sample a frequency of performing the SSB measurement by a factor of a first number in response to a determination that the SSB measurement satisfies the threshold; and down-sample the frequency of performing the SSB measurement by a factor of a second number in response to a determination that the SSB measurement does not satisfy the threshold, where the first number is less than the second number.

The processor may be further configured to: determine whether the channel condition is in a third mode, where the third mode indicates a higher channel quality than the second mode; and in response to a determination that the channel condition is in the third mode: perform, by the UE, one or more tracking loops before a paging occasion in every X measurement cycles, where X is a number greater than one; and invoke a SSBS-level sleep during at least some measurement cycles. To invoke the SSBS-level sleep, the processor may be further configured to enter a sleep mode during a duration of a SSBS. The processor may be further configured to down-sample a frequency of performing measurements of the SSBS. The processor may be further configured to down-sample a frequency of performing measurements of the first SSB. The processor may be further configured to: determine whether the first measurement satisfies a threshold; and determine the measurement cycle frequency based on whether the first measurement satisfies the threshold. The processor may be further configured to determine the first measurement by determining a RSRP measurement of the first SSB, a RSRQ measurement of the first SSB, or a SINR measurement of the first SSB.

In some aspects, a computer-readable medium having program code recorded thereon, the program code comprising: code for causing a wireless communication device to receive a first SSB; code for causing the wireless communication device to determine a first measurement for the first SSB; code for causing the wireless communication device to determine a measurement cycle frequency for performing a SSB measurement based on the first measurement; and code for causing the wireless communication device to perform the SSB measurement based on the measurement cycle frequency. The computer-readable medium may further include code for causing the wireless communication device to monitor for one or more SSBs during a SMTC window, where the code for causing the wireless communication device to receive the first SSB includes code for causing the wireless communication device to receive the first SSB during the SMTC window. The computer-readable medium may further include code for causing the wireless communication device to determine, based on a condition of a channel in which the first SSB is received, a mode of a plurality of modes, where the code for causing the wireless communication device to determine the measurement cycle frequency includes code for causing the wireless communication device to determine the measurement cycle frequency based on the mode. The wireless communication device may be a UE. The computer-readable medium may further include code for causing the wireless communication device to determine a RSRP measurement of the first SSB, a RSRQ measurement of the first SSB, or a SINR measurement of the first SSB.

In some aspects, a computer-readable medium having program code recorded thereon, the program code comprising: code for causing the wireless communication device to determine a first measurement for a first SSB; code for causing the wireless communication device to determine a measurement cycle frequency for performing a SSB measurement based on the first measurement; and code for causing the wireless communication device to perform the SSB measurement based on the measurement cycle frequency.

In some aspects, an apparatus includes means for receiving a first SSB; means for determining a first measurement for the first SSB; means for determining a measurement cycle frequency for performing a SSB measurement based on the first measurement; and means for performing the SSB measurement based on the measurement cycle frequency. The apparatus may include means for determining a RSRP measurement of the first SSB, means for determining a RSRQ measurement of the first SSB, or means for determining a SINR measurement of the first SSB. In some aspects, an apparatus includes means for determining a first measurement for a first SSB; means for determining a measurement cycle frequency for performing a SSB measurement based on the first measurement; and means for performing the SSB measurement based on the measurement cycle frequency.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a user equipment (UE), a first measurement for a first SSB;
   determining, by the UE, a measurement cycle frequency for performing a SSB measurement based on the first measurement; and
   performing, by the UE, the SSB measurement based on the measurement cycle frequency.

2. The method of claim 1, further comprising:
   monitoring, by the UE, for one or more SSBs during a synchronization block measurement timing configuration (SMTC) window, wherein receiving the first SSB includes receiving the first SSB during the SMTC window.

3. The method of claim 1, further comprising:
   determining, based on a condition of a channel in which the first SSB is received, a mode of a plurality of modes; and
   determining, based on the mode, the measurement cycle frequency.

4. The method of claim 1, further comprising:
   determining whether a channel condition, associated with the first SSB, is in a first mode or a second mode, wherein the second mode indicates a higher channel quality than the first mode; and
   performing, by the UE, at least one of an intra-frequency search or one or more tracking loops before a paging occasion in a measurement cycle in response to a determination that the channel condition is in the first mode.

5. The method of claim 4, further comprising:
   in response to a determination that the channel condition is in the second mode:
      performing, by the UE, one or more tracking loops before a paging occasion in one or more measurement cycles; and
      invoking a SSB-level sleep during at least some measurement cycles.

6. The method of claim 5, wherein invoking the SSB-level sleep includes entering a sleep mode during a duration of at least one SSB of a synchronization signal burst set (SSBS).

7. The method of claim 5, further comprising:
   determining, by the UE, whether the SSB measurement satisfies a threshold, wherein determining the measurement cycle frequency includes down-sampling a frequency of performing the SSB measurement by a factor of a first number in response to a determination that the SSB measurement satisfies the threshold, and wherein determining the measurement cycle frequency includes down-sampling the frequency of performing the SSB measurement by a factor of a second number in response to a determination that the SSB measurement does not satisfy the threshold, and wherein the first number is less than the second number.

8. The method of claim 4, further comprising:
   determining whether the channel condition is in a third mode, wherein the third mode indicates a higher channel quality than the second mode; and
   in response to a determination that the channel condition is in the third mode:
      performing, by the UE, one or more tracking loops before a paging occasion in every X measurement cycles, wherein X is a number greater than one; and
      invoking a SSBS-level sleep during at least some measurement cycles.

9. The method of claim 8, wherein invoking the SSBS-level sleep includes entering a sleep mode during a duration of a SSBS.

10. The method of claim 9, wherein determining the measurement cycle frequency includes down-sampling a frequency of performing measurements of the SSBS.

11. The method of claim 1, wherein determining the measurement cycle frequency includes down-sampling a frequency of performing measurements of the first SSB.

12. The method of claim 1, further comprising:
    determining whether the first measurement satisfies a threshold; and
    determining the measurement cycle frequency based on whether the first measurement satisfies the threshold.

13. The method of claim 1, wherein determining the first measurement includes determining a reference signal received power (RSRP) measurement of the first SSB, a reference signal received quality (RSRQ) measurement of the first SSB, or a signal-to-interference-plus-noise ratio (SINR) measurement of the first SSB.

14. An apparatus comprising:
    a processor configured to:
       determine, by a user equipment (UE), a first measurement for a first synchronization signal block (SSB);
       determine, by the UE, a measurement cycle frequency for performing a SSB measurement based on the first measurement; and
       perform, by the UE, the SSB measurement based on the measurement cycle frequency.

15. The apparatus of claim 14, further comprising:
    a transceiver configured to receive the first SSB during a synchronization block measurement timing configuration (SMTC) window,
    wherein the processor is configured to monitor, by the UE, for one or more SSBs during the SMTC window.

16. The apparatus of claim 14, wherein the processor is further configured to:
    determine, based on a condition of a channel in which the first SSB is received, a mode of a plurality of modes; and
    determine the measurement cycle frequency based on the mode.

17. The apparatus of claim 14, wherein the processor is further configured to:
    determine whether a channel condition, associated with the first SSB, is in a first mode or a second mode, wherein the second mode indicates a higher channel quality than the first mode; and
    perform, by the UE, an intra-frequency search and one or more tracking loops before a paging occasion in a measurement cycle in response to a determination that the channel condition is in the first mode.

18. The apparatus of claim 17, wherein the processor is further configured to in response to a determination that the channel condition is in the second mode:
- perform, by the UE, one or more tracking loops before a paging occasion in one or more measurement cycles; and
- invoke a SSB-level sleep during at least some measurement cycles.

19. The apparatus of claim 18, wherein to invoke the SSB-level sleep, the processor is further configured to enter a sleep mode during a duration of at least one SSB of a synchronization signal burst set (SSBS).

20. The apparatus of claim 18, wherein the processor is further configured to:
- determine, by the UE, whether the SSB measurement satisfies a threshold;
- down-sample a frequency of performing the SSB measurement by a factor of a first number in response to a determination that the SSB measurement satisfies the threshold; and
- down-sample the frequency of performing the SSB measurement by a factor of a second number in response to a determination that the SSB measurement does not satisfy the threshold, wherein the first number is less than the second number.

21. The apparatus of claim 17, wherein the processor is further configured to:
- determine whether the channel condition is in a third mode, wherein the third mode indicates a higher channel quality than the second mode; and
- in response to a determination that the channel condition is in the third mode:
  - perform, by the UE, one or more tracking loops before a paging occasion in every X measurement cycles, wherein X is a number greater than one; and
  - invoke a SSBS-level sleep during at least some measurement cycles.

22. The apparatus of claim 21, wherein to invoke the SSBS-level sleep, the processor is further configured to enter a sleep mode during a duration of a SSBS.

23. The apparatus of claim 22, wherein the processor is further configured to down-sample a frequency of performing measurements of the SSBS.

24. The apparatus of claim 14, wherein the processor is further configured to down-sample a frequency of performing measurements of the first SSB.

25. The apparatus of claim 14, wherein the processor is further configured to:
- determine whether the first measurement satisfies a threshold; and
- determine the measurement cycle frequency based on whether the first measurement satisfies the threshold.

26. The apparatus of claim 14, wherein the processor is further configured to determine the first measurement by determining a reference signal received power (RSRP) measurement of the first SSB, a reference signal received quality (RSRQ) measurement of the first SSB, or a signal-to-interference-plus-noise ratio (SINR) measurement of the first SSB.

* * * * *